United States Patent
Kim et al.

(10) Patent No.: US 9,949,211 B2
(45) Date of Patent: Apr. 17, 2018

(54) METHOD FOR CONTROLLING PUCCH TRANSMISSION POWER IN WIRELESS COMMUNICATION SYSTEM AND TERMINAL FOR SAME

(75) Inventors: Dongcheol Kim, Anyang-si (KR); Hangyu Cho, Anyang-si (KR); Seunghee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 315 days.

(21) Appl. No.: 14/240,718

(22) PCT Filed: Aug. 24, 2012

(86) PCT No.: PCT/KR2012/006771
§ 371 (c)(1),
(2), (4) Date: Feb. 24, 2014

(87) PCT Pub. No.: WO2013/028033
PCT Pub. Date: Feb. 28, 2013

(65) Prior Publication Data
US 2014/0204842 A1 Jul. 24, 2014

Related U.S. Application Data

(60) Provisional application No. 61/526,687, filed on Aug. 24, 2011.

(51) Int. Cl.
*H04W 52/14* (2009.01)
*H04W 52/32* (2009.01)
*H04W 52/42* (2009.01)

(52) U.S. Cl.
CPC ........ *H04W 52/146* (2013.01); *H04W 52/325* (2013.01); *H04W 52/42* (2013.01)

(58) Field of Classification Search
CPC .. H04W 52/146; H04W 52/42; H04W 52/325
(Continued)

(56) References Cited

U.S. PATENT DOCUMENTS

2011/0096815 A1 4/2011 Shin et al.
2011/0228731 A1* 9/2011 Luo ................ H01Q 3/2605
370/329

(Continued)

OTHER PUBLICATIONS

"Dual RM segmentation and format 3 power control" Jan. 2011.*
(Continued)

*Primary Examiner* — Alex Skripnikov
*Assistant Examiner* — Pamit Kaur
(74) *Attorney, Agent, or Firm* — Lee Hong Degerman Kang Waimey

(57) ABSTRACT

A terminal for controlling the physical uplink control channel (PUCCH), according to the present invention, comprises: a processor for deciding the uplink transmission power for a PUCCH format 3 transmission; and a transmitter for transmitting the PUCCH format 3 at the uplink transmission power that is decided, wherein the processor distinguishes and decides the uplink transmission power from bits of the PUCCH format 3, based upon a predetermined number of information bits, the processor controls so that a different diversity method is applied to the PUCCH format 3, based upon the predetermined number of information bits, and wherein the transmitter transmits the PUCCH format 3 to which the different diversity method is applied with respect to the PUCCH format 3, by means of the processor, based upon the predetermined number of information bits.

8 Claims, 23 Drawing Sheets

< Required SNR for TxD schemes - ETU 3km/h, DTX->ACK DEF2, Detector type B >

(58) Field of Classification Search
USPC .......................................................... 370/328
See application file for complete search history.

(56) References Cited

U.S. PATENT DOCUMENTS

2012/0113898 A1* 5/2012 Luo ...................... H04B 7/0456
370/328
2012/0113907 A1* 5/2012 Baldemair .......... H04W 52/146
370/329

OTHER PUBLICATIONS

CATT, "Dual RM segmentation and format 3 power control", R1-110045, 3GPP TSG RAN WG1 Meeting #63bis, Jan. 2011, 5 pages.
ZTE, "Power control of PUCCH for LTE-A TDD", R1-110984, 3GPP TSG-RAN WG1 #64, Feb. 2011, 4 pages.
Ericsson, et al., "Power control for PUCCH format 3 with SORTD", R1-110028, 3GPP TSG RAN WG1 Meeting #63bis, Jan. 2010, 3 pages.
PCT International Application No. PCT/KR2012/006771, Written Opinion of the International Searching Authority dated Feb. 5, 2013, 15 pages.

* cited by examiner

FIG. 3
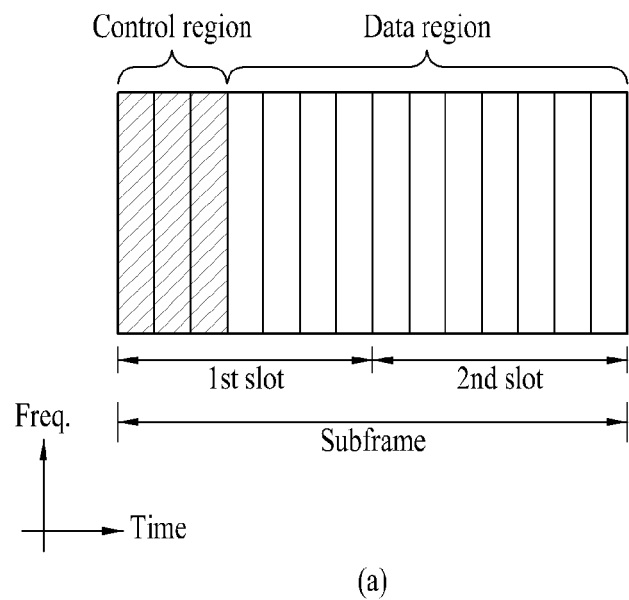
(a)
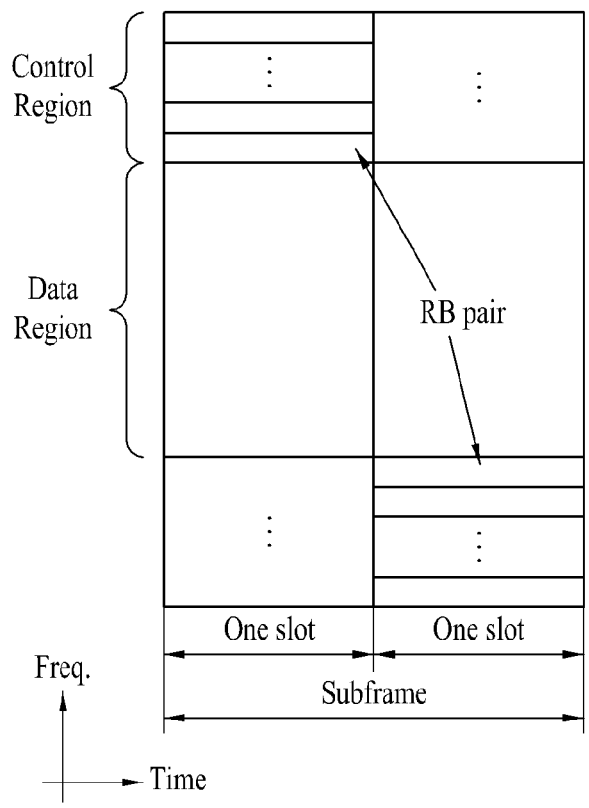
(b)

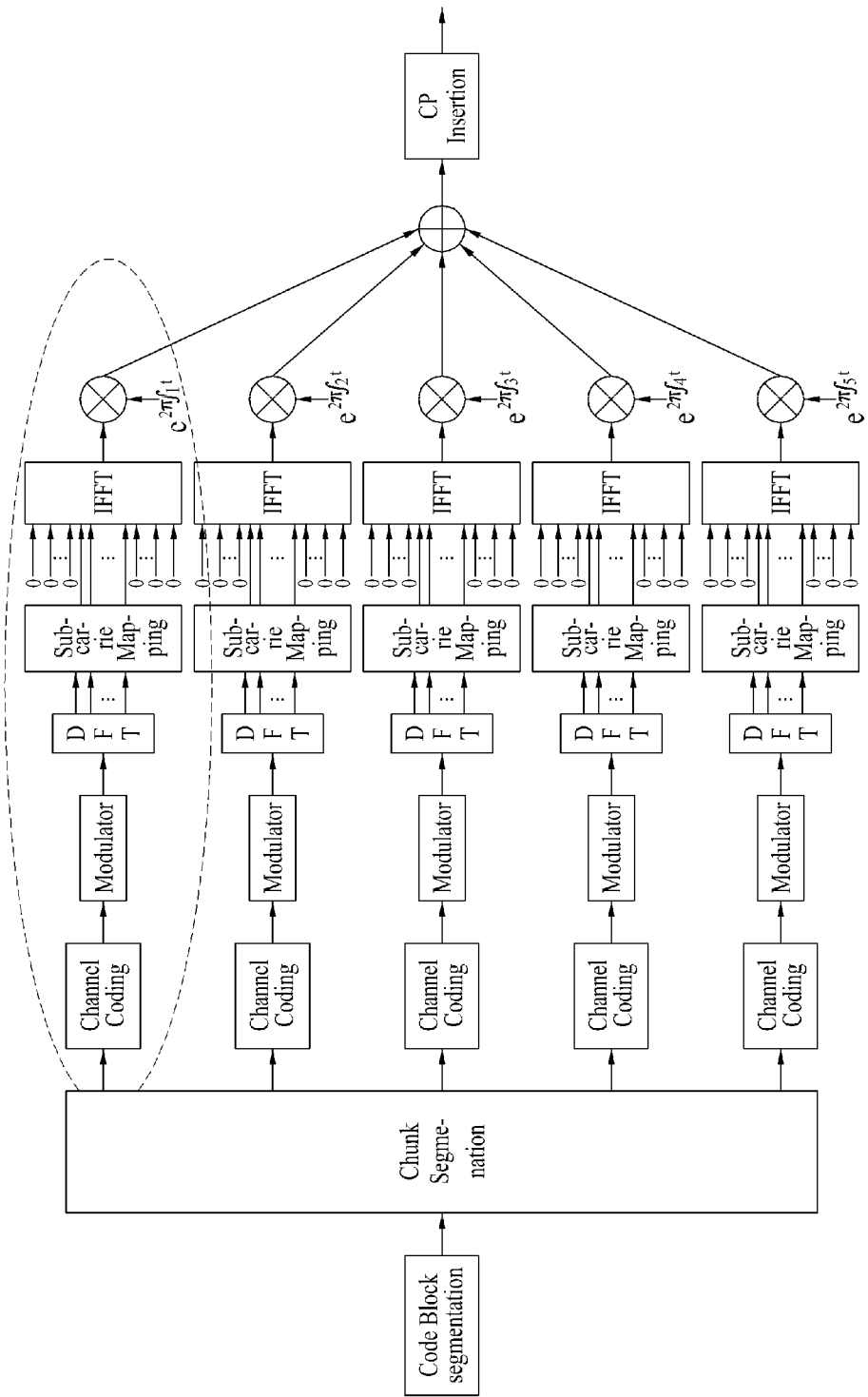

Reuse of LTE PUCCH format 2 structure (normal CP case)

Reuse of LTE PUCCH format 2 structure (extended CP case)

< Required SNR for TxD schemes – ETU 3km/h, DTX->ACK DEF2, Detector type A >

< Required SNR for TxD schemes – ETU 3km/h, DTX->ACK DEF2, Detector type B >

< Required SNR for TxD schemes – ETU 3km/h, DTX->ACK DEF2, Detector type B >

METHOD FOR CONTROLLING PUCCH TRANSMISSION POWER IN WIRELESS COMMUNICATION SYSTEM AND TERMINAL FOR SAME

CROSS-REFERENCE TO RELATED APPLICATIONS

This application is the National Stage filing under 35 U.S.C. 371 of International Application No. PCT/KR2012/006771, filed on Aug. 24, 2012, which claims the benefit of U.S. Provisional Application No. 61/526,687, filed on Aug. 24, 2011, the contents of which are hereby incorporated by reference herein in their entirety.

TECHNICAL FIELD

The present invention relates to wireless communication and, more specifically, to a method for controlling PUCCH transmission power in a wireless communication system and user equipment (UE) for the same.

BACKGROUND ART

MIMO (multiple input multiple output) is drawing attention as broadband wireless mobile communication technology. MIMO refers to a system that improves data communication efficiency using a plurality of antennas. MIMO can be implemented using MIMO schemes such as spatial multiplexing and space diversity according to whether the same data is transmitted or not.

Spatial multiplexing can transmit data at a high rate by simultaneously transmitting different pieces of data through a plurality of transmit (Tx) antennas without increasing system bandwidth. Space diversity can obtain transmit diversity by transmitting the same data through a plurality of Tx antennas. An example of space diversity is space time channel coding.

In addition, MIMO can be categorized into an open loop scheme and a closed loop scheme based on whether or not a receiver feeds back channel information to a transmitter. The open loop scheme includes BLAST in which a transmitter transmits information in parallel and a receiver detects a signal by repeatedly using ZF (Zero Forcing) and MMSE (Minimum Mean Square Error) and increases the quantity of information by the number of Tx antennas, STTC (Space-Time Trellis Coding) capable of obtaining transmit diversity and coding gain using a new space region, etc. The closed loop scheme includes TxAA (Transmit Antenna Array), etc.

In a wireless channel environment, fading occurs such that a channel state irregularly varies in the time domain and the frequency domain. Accordingly, a receiver corrects a received signal using channel information in order to restore data transmitted from a transmitter and detect a correct signal.

A wireless communication system transmits a signal known to both the transmitter and the receiver and detects channel information using a degree of distortion when the signal is transmitted on a channel. This signal is called a reference signal (or pilot signal) and detection of channel information is referred to as channel estimation. The reference signal does not include data and has high power. When data is transmitted/received using multiple antennas, a reference signal is present per Tx antenna since channel state between each Tx antenna and each Rx antenna needs to be known.

LTE uses a single antenna for uplink control channel transmission. LTE-A, a next-generation mobile communication system, introduces a multi-antenna transmission scheme in order to improve uplink control channel performance.

DISCLOSURE

Technical Problem

An object of the present invention devised to solve the problem lies in a method for a UE to control physical uplink control channel (PUCCH) transmission power.

Another object of the present invention is to provide a UE for controlling PUCCH transmission power.

Technical Solution

The object of the present invention can be achieved by providing a method for controlling physical uplink control channel (PUCCH) transmission power by user equipment (UE) in a wireless communication system, the method including: determining an uplink transmit (Tx) power for PUCCH format 3 transmission; and transmitting PUCCH format 3 with the determined uplink Tx power, wherein the uplink Tx power is determined based on a predetermined number of information bits from among bits of the PUCCH format 3, wherein the PUCCH format 3 is transmitted by applying different diversity schemes to the PUCCH format 3 based upon the predetermined number of information bits. The uplink Tx power may be determined using different values of an uplink Tx power control parameter based upon the predetermined number of information bits from among the bits of the PUCCH format 3. The uplink Tx power control parameter may vary according to PUCCH format and the quantity of information. When the number of information bits exceeds the predetermined number of information bits from among the bits of the PUSCH format 3, the uplink Tx power parameter may be represented by Equation A $$h(n_{CQI}, n_{HARQ}, n_{SR}) = \frac{n_{HARQ} + n_{SR} - 1}{2} \text{ or}$$

$$h(n_{CQI}, n_{HARQ}, n_{SR}) = \frac{n_{HARQ} + n_{SR} - 2}{2} \text{ or}$$

$$h(n_{CQI}, n_{HARQ}, n_{SR}) = \frac{n_{HARQ} + n_{SR} - 1}{4} \text{ or}$$

$$h(n_{CQI}, n_{HARQ}, n_{SR}) = \frac{n_{HARQ} + n_{SR} - 2}{4} \text{ or}$$

$$h(n_{CQI}, n_{HARQ}, n_{SR}) = \frac{n_{HARQ} + n_{SR} - 1}{8}$$

wherein $n_{CQI}$ indicates the number of information bits of a channel quality indicator (CQI) in a specific subframe, $n_{HARQ}$ represents the number of HARQ bits in the specific subframe, and $n_{SR}$ is 1 when the specific subframe is composed of an SR for a UE having no transport block related to UL-SCH and 0 in other cases. When the number of information bits is less than the predetermined number of information bits from among the bits of the PUSCH format 3, the uplink Tx power parameter may be represented by Equation B $$h(n_{CQI}, n_{HARQ}, n_{SR}) = \frac{n_{HARQ} + n_{SR} - 1}{3} \text{ or}$$

-continued $$h(n_{CQI}, n_{HARQ}, n_{SR}) = \frac{n_{HARQ} + n_{SR} - 1}{2}.$$

The predetermined number of information bits may be 11. Frequency switched transmit diversity (FSTD), space time block coding (STBC), space frequency block coding (SFBC) or precoding vector switching (PVS) may be used to transmit the PUCCH format 3 when the number of information bits exceeds the predetermined number of information bits from among the bits of the PUCCH format 3. Spatial orthogonal resource transmit diversity (SORTD) may be used to transmit the PUCCH format 3 when the number of information bits is less than the predetermined number of information bits from among the bits of the PUCCH format 3.

In another aspect of the present invention, provided herein is a user equipment (UE) for controlling PUCCH transmission power in a wireless communication system, including: a processor for determining an uplink Tx power for PUCCH format 3 transmission; and a transmitter for transmitting PUCCH format 3 with the determined uplink Tx power, wherein the processor determines the uplink Tx power based on a predetermined number of information bits from among bits of the PUCCH format 3, wherein the processor controls different diversity schemes to be applied to the PUCCH format 3 based upon the predetermined number of information bits, wherein the transmitter transmits the PUCCH format 3 to which different diversity schemes are applied by the processor based upon the predetermined number of information bits. The processor may determine the uplink Tx power using different values of an uplink Tx power control parameter based upon the predetermined number of information bits from among the bits of the PUCCH format 3. The uplink Tx power control parameter may vary according to PUCCH format and the quantity of information. The processor may control the PUCCH format 3 to be transmitted using FSTD, STBC, SFBC or PVS when the number of information bits exceeds the predetermined number of information bits from among the bits of the PUCCH format 3. The processor may control the PUCCH format 3 to be transmitted using SORTD when the number of information bits is less than the predetermined number of information bits from among the bits of the PUCCH format 3.

Advantageous Effects

According to embodiments of the present invention, even if a UE applies a new transmission scheme rather than SORTD to PUCCH format 3, control channel transmission power can be efficiently controlled by considering a power element reflecting the new transmission scheme.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 3 illustrates a downlink subframe structure and an uplink subframe structure of 3GPP LTE;

FIG. 11 illustrates a signal processing procedure of segmented SC-FDMA;

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that 3GPP LTE and LTE-A mobile communication systems are used. However, the description is applicable to any other mobile communication system except for specific features inherent to the 3GPP LTE and LTE-A systems.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a user equipment (UE) is assumed to refer to a mobile or fixed user end device such as a mobile station (MS), an advanced mobile station (AMS), etc. The term 'base station (BS)' is assumed to refer to any node of a network end, such as a Node B, eNode B, an access point (AP), etc., communicating with a UE. While the following description is based on 3GPP LTE and LTE-A, the present invention is applicable to other communication systems.

In a mobile communication system, a UE may receive information from a BS on a downlink and transmit information to the BS on an uplink. The information that the UE transmits or receives includes data and various types of control information. There are many physical channels according to the types and usages of information that the UE transmits or receives.

Figure 1:
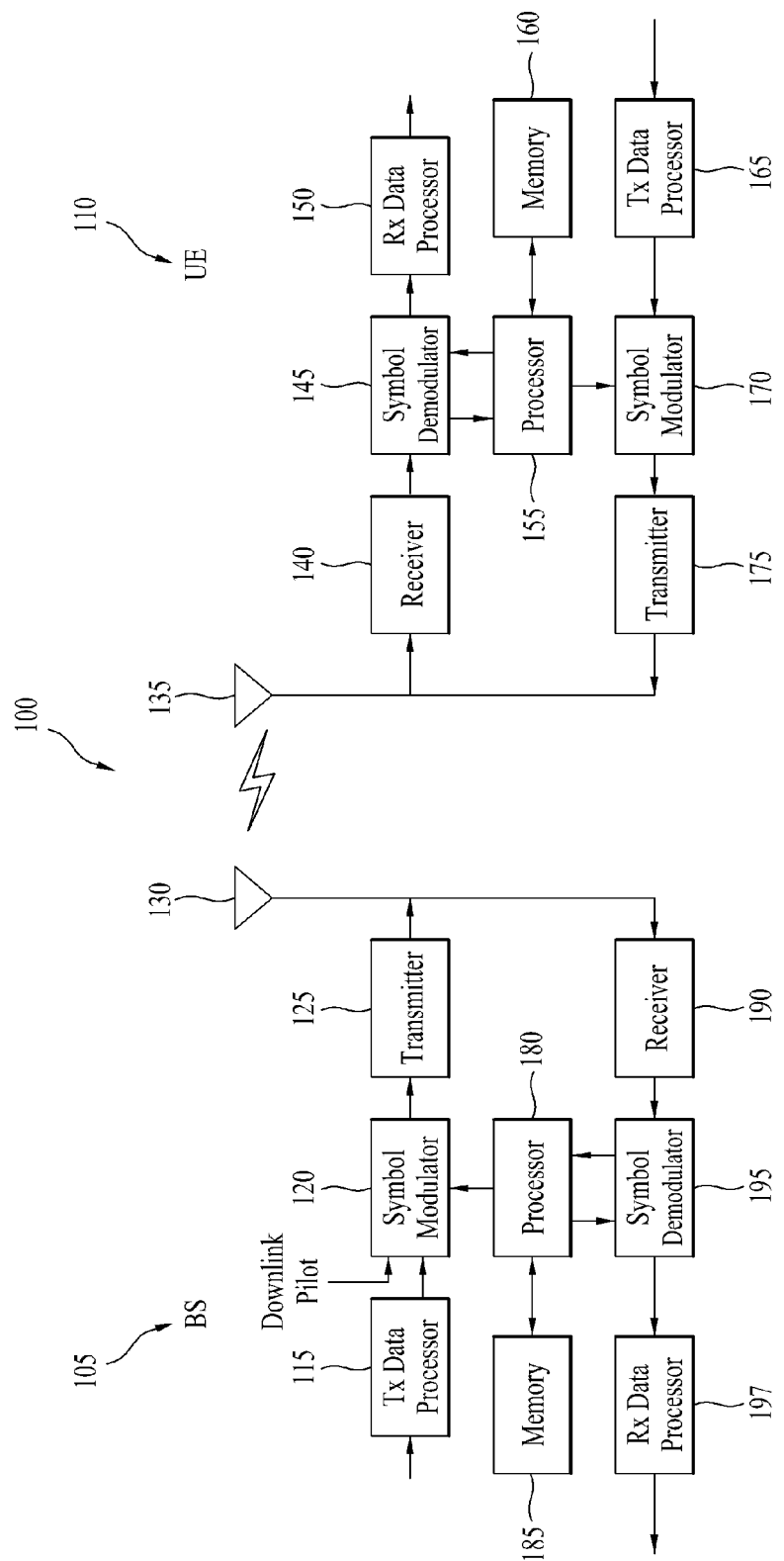
FIG. 1 is a block diagram illustrating configurations of a base station (BS) 105 and a UE 110 in a wireless communication system 100.

FIG. 1 is a block diagram illustrating configurations of a BS 105 and a UE 110 in a wireless communication system 100.

While one BS 105 and one UE 110 are shown in FIG. 1 to simplify the configuration of the wireless communication system 100, the wireless communication system 100 may obviously include one or more BSs and/or one or more UEs.

Referring to FIG. 1, the BS 105 may include a transmission (Tx) data processor 115, a symbol modulator 120, a transmitter 125, a Tx/Rx antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the BS 105 and the UE 110, the BS 105 and the UE 110 include multiple antennas. Hence, the BS 105 and the UE 110 support MIMO (Multiple Input Multiple Output). Furthermore, the BS 105 may support both single user-MIMO (SU-MIMO) and multi-user-MIMO (MU-MIMO) in the present invention.

On the downlink, the Tx data processor 115 receives traffic data, processes the received traffic data through formatting, coding, interleaving, and modulation (or symbol mapping), and thus outputs modulated symbols ("data symbols"). The symbol modulator 120 processes the data symbols received from the Tx data processor 115 and pilot symbols, thus producing a symbol stream.

More specifically, the symbol modulator 120 multiplexes the data symbols and the pilot symbols and transmits the multiplexed symbols to the transmitter 125. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 converts the symbol stream into one or more analog signals and generates a downlink signal suitable for transmission on a radio channel by additionally processing the analog signals (e.g. amplification, filtering, and frequency upconversion). The downlink signal is transmitted to the UE 110 through the antenna 130.

The UE 110 receives the downlink signal from the BS 105 through the antenna 135 and provides the received downlink signal to the receiver 140. The receiver 140 processes the downlink signal, for example, through filtering, amplification and frequency downconversion and converts the processed downlink signal into digital samples. The symbol demodulator 145 demodulates received pilot symbols and outputs the demodulated pilot symbols to the processor 155 for use in channel estimation.

The symbol demodulator 145 receives a frequency response estimate with respect to downlink from the processor 155, acquires data symbol estimates (i.e. estimates of the transmitted data symbols) by demodulating the received data symbols using the frequency response estimate and provides the data symbol estimates to the Rx data processor 150. The Rx data processor 150 demodulates the data symbol estimates (i.e. performs symbol demapping), deinterleaves the demodulated data symbols, and decodes the deinterleaved data symbols, thereby recovering the traffic data transmitted by the BS 105.

The operations of the symbol demodulator 145 and the Rx data processor 150 are complementary to the operations of the symbol modulator 120 and the Tx data processor 115 of the BS 105.

On the uplink, in the UE 110, the Tx data processor 165 outputs data symbols by processing received traffic data. The symbol modulator 170 multiplexes the data symbols received from the Tx data processor 165 with pilot symbols, modulates the multiplexed symbols, and outputs a stream of the symbols to the transmitter 175. The transmitter 175 generates an uplink signal by processing the symbol stream and transmits the uplink signal to the BS 105 through the antenna 135.

The BS 105 receives the uplink signal from the UE 110 through the antenna 130. In the BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 control, adjust and manage operations of the UE 110 and the BS 105. The processors 155 and 180 may be connected respectively to the memories 160 and 185 that store program code and data. The memories 160 and 185 store an operating system, applications, and general files, in connection with the processors 155 and 180.

The processors 155 and 180 may also be called controllers, microcontrollers, microprocessors, or microcomputers. The processors 155 and 180 may be configured in hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 155 and 180.

When the embodiments of the present invention are implemented using firmware or software, the firmware or software may be configured to include a module, a procedure, a function, etc. which performs functions or operations according to the present invention. The firmware or software may be included in the processors 155 and 180, or stored in the memories 160 and 185 and invoked from the memories 160 and 185 by the processors 155 and 180.

The layers of radio interface protocols between a UE/BS and a network may be classified into Layers 1, 2 and 3 (L1, L2 and L3) based on the three lowest layers of the open system interconnection (OSI) model. A physical layer corresponds to L1 and provides an information transmission service on physical channels. A radio resource control (RRC) layer corresponds to L3 and provides radio control resources between the UE and the network. The UE/BS and the network exchange RRC messages through the RRC layer.

Figure 2:
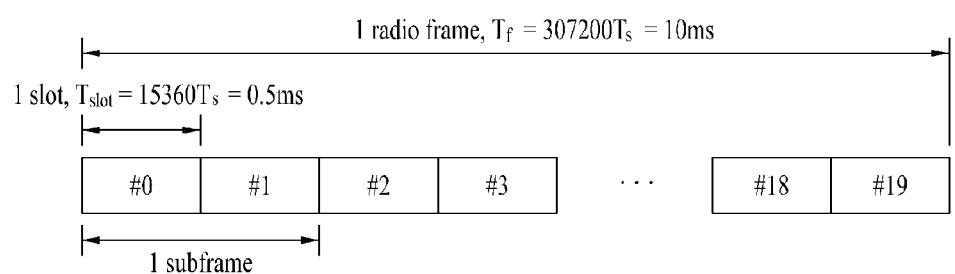
FIG. 2 illustrates a radio frame structure used in 3GPP LTE which is a mobile communication system.

FIG. 2 illustrates a radio frame structure used in 3GPP LTE.

Referring to FIG. 2, a radio frame has a duration of 10 ms (327200 Ts) and is composed of 10 subframes of equal size. Each subframe is 1 ms in duration and consists of 2 slots. Each slot is 0.5 ms (15360 Ts) in duration. Here, Ts is sampling time and is represented by Ts=1/(15 kHz×2048)= 3.2552×10⁻⁸ (about 33 ns). A slot includes a plurality of OFDM symbols or SC-FDMA symbols in the time domain and includes a plurality of resource blocks (RBs) in the frequency domain.

In LTE, one RB includes 12 subcarrier×7(6) OFDM symbols or single carrier-frequency division multiple access (SC-FDMA) symbols. A transmission time interval (TTI), a unit time for which data is transmitted, can be determined as one or more subframes. The above-described radio frame structure is exemplary and the number of subframes included in a radio frame, the number of slots included in a subframe and the number of OFDM symbols or SC-FDMA symbols included in a slot can be varied.

FIG. 3 illustrates a downlink subframe structure and an uplink subframe structure of 3GPP LTE.

Referring to FIG. 3(a), a downlink subframe includes 2 slots in the time domain. Three OFDM symbols located at the beginning of the first slot of a downlink subframe correspond to a control region to which control channels are allocated and the remaining OFDM symbols correspond to a data region to which a physical downlink shared channel (PDSCH) is allocated.

Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols (i.e. control region size) used for transmission of control channels within the subframe. Control information transmitted through the PDCCH is referred to as downlink control information (DCI). The DCI refers to uplink resource allocation information, downlink resource allocation information, an uplink Tx power control command for UE groups, etc. The PHICH carries an acknowledgment (ACK) (ACK)/negative-acknowledgment (NACK) signal for uplink hybrid automatic repeat request (HARQ). That is, an ACK/NACK signal for uplink data transmitted by a UE is transmitted on the PHICH.

The PDCCH will now be described.

A BS can transmit, through the PDCCH, resource allocation information and transmission format of a PDSCH (which may be referred to as a DL grant), resource allocation information of a PUSCH (which may be referred to as a UL grant), a set of transmit power control (TPC) commands on individual UEs within an arbitrary UE group, activation of a voice over Internet protocol (VoIP), etc. The BS can transmit a plurality of PDCCHs within a control region and a UE can monitor the PDCCHs. The PDCCH includes an aggregate of one or several consecutive control channel elements (CCEs). The BS can transmit the PDCCH including the aggregate of one or several CCEs in the control region after subblock interleaving of the PDCCH. A CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

Control information carried on the PDCCH is called downlink control information (DCI). Table 1 shows DCI according to DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 conveys uplink resource allocation information, DCI format 1 to DCI format 2 are used to indicate downlink resource allocation information, and DCI format 3 and DCI format 3A indicate uplink transmit power control (TPC) command for UE groups.

DCI formats 3/3A includes TPC commands for a plurality of UEs. In the case of DCI formats 3/3A, a BS masks CRC with TPC-ID. The TPC-ID is an identifier demasked by a UE to monitor a PDCCH carrying a TPC command. The TPC-ID is used for the UE to decode the PDCCH in order to check whether the TPC command is carried on the PDCCH. The TPC-ID may be defined by reusing the existing identifier such as C-RNTI (radio network temporary identifier), PI-RNTI, SC-RNTI or RA-RNTI or defined as a new identifier. The TPC-ID is distinguished from the C-RNTI for a specific UE and the PI-RNTI, SC-RNTI and RA-RNTI for all UEs in a cell since the TPC-ID is an identifier for UEs belonging to a specific set in a cell. This is because only N UEs can receive TPC commands therefor if DCI includes the TPC commands for the N UEs. If the DCI includes TPC commands for all UEs in a cell, the TPC-ID becomes an identifier for all UEs in the cell.

A UE searches a search space in a subframe for the TPC-ID by monitoring a set of PDCCH candidates. Here, the UE may search a common search space or a UE-specific search space for the TPC-ID. The common search space refers to a search space searched by all UEs in a cell whereas the UE-specific search space refers to a search space searched by a specific UE. If the TPC-ID is demasked for a corresponding PDCCH candidate and thus a CRC error is not detected, the UE can receive a corresponding TPC command on the PDCCH.

TPC-ID for a PDCCH that carries a plurality of TPC commands is defined. Upon detection of the TPC-ID, a UE receives a TPC command on a PDCCH corresponding to the TPC-ID. The TPC command is used to control uplink channel transmit power. Accordingly, it is possible to prevent failure of transmission to a BS or interference to other UEs due to wrong power control.

A method of mapping resources by a BS for PDCCH transmission in an LTE system is described briefly.

In general, the BS can transmit scheduling allocation information and other control information through a PDCCH. A physical control channel may be transmitted through an aggregation of one or more contiguous CCEs. A CCE includes 9 resource element groups (REGs). The number of REGs which are not allocated to a PCFICH or PHICH is represented by NREG. CCEs that can be used in the system correspond to 0 to NCCE-1 (here, $N_{CCE} = \lfloor N_{REG}/9 \rfloor$). A PDCCH supports multiple formats as shown in the following table 2. A PDCCH composed of n contiguous CCEs starts from a CCE that performs i mod n=0 (here, i is a CCE number). Multiple PDCCHs may be transmitted through one subframe.

TABLE 2

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, the BS can determine a PDCCH format on the basis of the number of regions in which the BS will transmit control information. A UE can reduce overhead by reading the control information on a CCE basis.

Referring to FIG. 3(b), an uplink subframe can be divided in the frequency domain into a control region and a data region. The control region is allocated a PUCCH for carrying uplink control information. The data region is allocated a PUSCH for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. The RB pair allocated to the PUCCH is frequency-hopped in a slot boundary.

Figure 4:
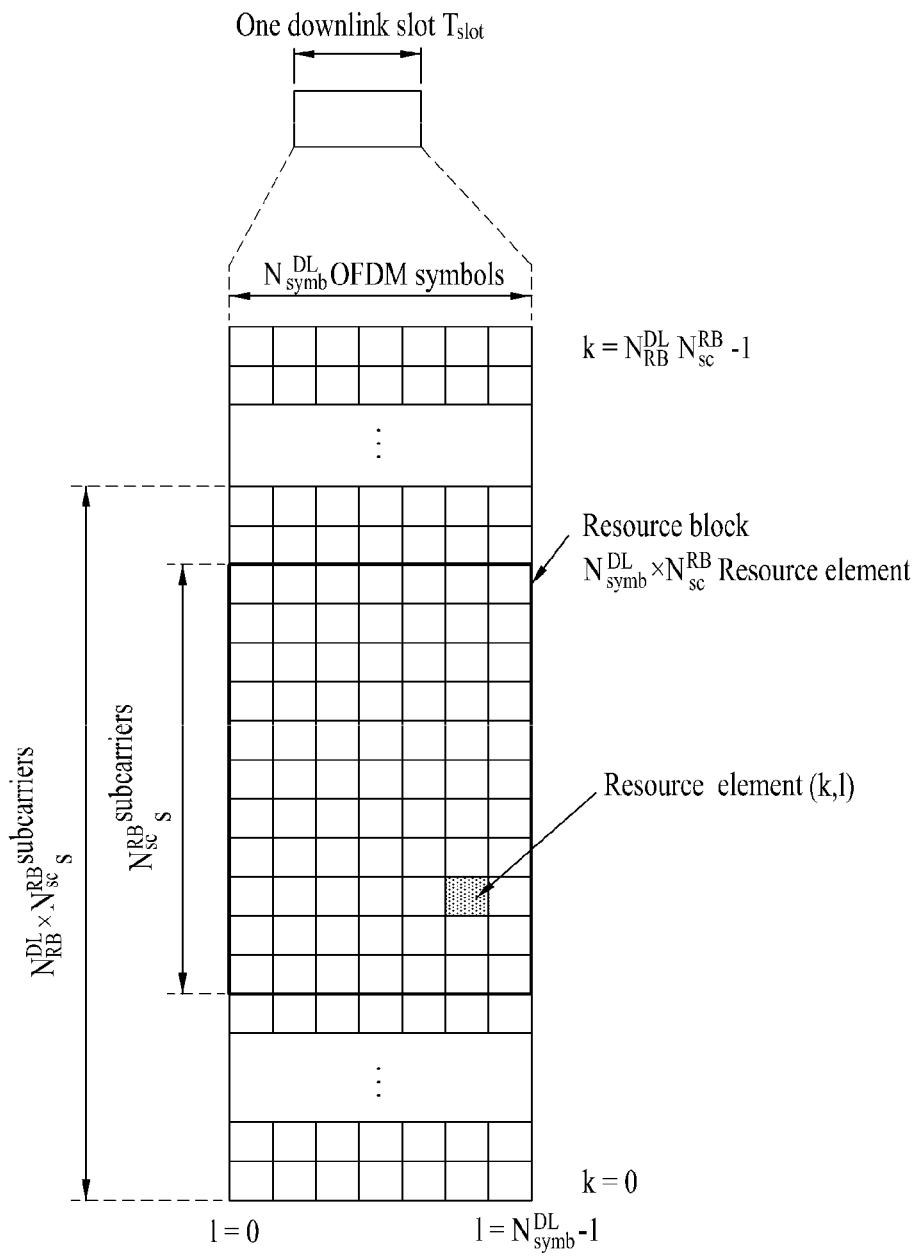
FIG. 4 illustrates a downlink time-frequency resource grid structure in 3GPP LTE.

FIG. 4 shows a downlink time-frequency resource grid structure used in 3GPP LTE.

A downlink signal transmitted in each slot may be described by a resource grid including $N_{RB}^{DL} \times N_{SC}^{RB}$ subcarriers and $N_{symb}^{DL}$ OFDM symbols. $N_{RB}^{DL}$ indicates the number of downlink resource blocks (RBs), represents the number of subcarriers which configure one RB, and $N_{symb}^{DL}$ indicates the number of OFDM symbols in one downlink slot. $N_{RB}^{DL}$ depends on a downlink transmission bandwidth set in a corresponding cell and needs to satisfy $N_{RB}^{min,DL} \leq N_{RB}^{DL} \leq N_{RB}^{max,DL}$. Here $N_{RB}^{min,DL}$ indicates a minimum bandwidth supported by a wireless communication system, and $N_{RB}^{max,RB}$ represents a maximum downlink bandwidth supported by the wireless communication system. While $N_{RB}^{min,DL}$ may be 6 and $N_{RB}^{max,RB}$ may be 110, they are not limited thereto. The number of OFDM symbols included in one slot may depend on the length of cyclic prefix (CP) and a subcarrier interval. In case of multi-antenna transmission, one resource grid can be defined per antenna port.

An element in the resource grid for each antenna port is called a resource element (RE) and uniquely identified by an index pair (k, l) in a slot. Here, k indicates a frequency-domain index ranging from 0 to $N_{RB}^{DL} N_{SC}^{RB}-1$, and l indicates a time-domain index ranging from 0 to $N_{symb}^{DL}-1$.

A RB shown in FIG. 4 is used to describe the mapping relationship between a physical channel and REs. RBs may be classified into a physical RB (PRB) and a virtual RB (VRB). One PRB is defined as $N_{symb}^{DL}$ consecutive OFDM symbols in the time domain and $N_{SC}^{RB}$ consecutive subcarriers in the frequency domain. Here, $N_{symb}^{DL}$ and $N_{SC}^{RB}$ may be predetermined values. For example, $N_{symb}^{DL}$ and $N_{SC}^{RB}$ may have values as shown in the following table 3. Accordingly, one PRB includes $N_{symb}^{DL} \times N_{SC}^{RB}$ REs. While one PRB can correspond to one slot in the time domain and correspond to 180 kHz in the frequency domain, it is not limited thereto.

TABLE 3

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

One PRB has a value in the range of 0 to $N_{RB}^{DL}-1$ in the frequency domain. The relationship between a PRB number $n_{PRB}$ in the frequency domain and a resource element (k, l) in one slot satisfies $$n_{PRB} = \left\lfloor \frac{k}{N_{sc}^{RB}} \right\rfloor.$$

The VRB has a size equal to the PRB. The VRB can be classified into a localized VRB (LVRB) and a distributed VRB (DVRB). For each VRB type, a pair of VRBs in two slots of one subframe are allocated with a single VRB number $n_{VRB}$.

The VRB may have a size equal to the PRB. The VRB is classified into a LVRB and a DVRB. For each of the LVRB and DVRB, a pair of VRB having a single VRB index (which may be referred to as a VRB number) are allocated to two slots in one subframe. In other words, $N_{RB}^{DL}$ VRBs which belong to the first one of two slots in one subframe are allocated one of indexes in the range of 0 to $N_{RB}^{DL}-1$, and $N_{RB}^{DL}$ VRBs which belong to the second slot are also allocated one of the indexes in the range of 0 to $N_{RB}^{DL}-1$.

A description will be given of a procedure through which a BS transmits a PDCCH to a UE in LTE.

The BS determines a PDCCH format according to DCI to be transmitted to the UE and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information, a system information RNTI (SI-RNTI) may be masked to the CRC. When the PDCCH is for a random access response, a random access-RNTI (RA-RNTI) may be masked to the CRC. Table 4 shows examples of identifiers masked to the PDCCH.

TABLE 4

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |

TABLE 4-continued

| Type | Identifier | Description |
|---|---|---|
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

The PDCCH carries control information for a specific UE corresponding thereto if the C-RNTI is used and carries common control information received by all UEs or a plurality of UEs in a cell if other RNTIs are used. The BS performs channel coding on the DCI to which the CRC is attached to generate coded data. Then, the BS performs rate matching based on the number or CCEs allocated to the PDCCH format. Subsequently, the BS modulates the coded data to generate modulated symbols and maps the modulated symbols to physical resource elements.

Figure 5:
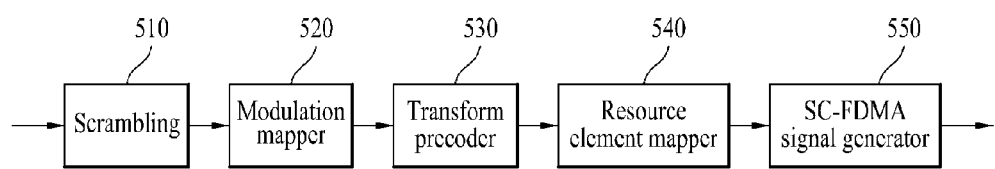
FIG. 5 illustrates a signal processing procedure through which a UE transmits an uplink signal.

FIG. 5 illustrates a signal processing procedure through which a UE transmits an uplink signal.

Referring to FIG. 5, a scrambling module 510 of the UE may scramble a transmission signal using a UE-specific scrambling signal in order to transmit the uplink signal. The scrambled signal is input to a modulation mapper 520 is modulated into complex symbols using binary phase shift keying (BPSK), quadrature phase shift keying (QPSK) or 16-quadrature amplitude modulation (16QAM)/64QAM on the basis of transmission signal type and/or channel state. The complex symbols are processed by a transform precoder 530 and then applied to a resource element mapper 540. The resource element mapper 540 can map the complex symbols to time-frequency resource elements. The signal processed in this manner can pass through a SC-FDMA signal generator 550 and then transmitted to the BS through an antenna.

Figure 6:
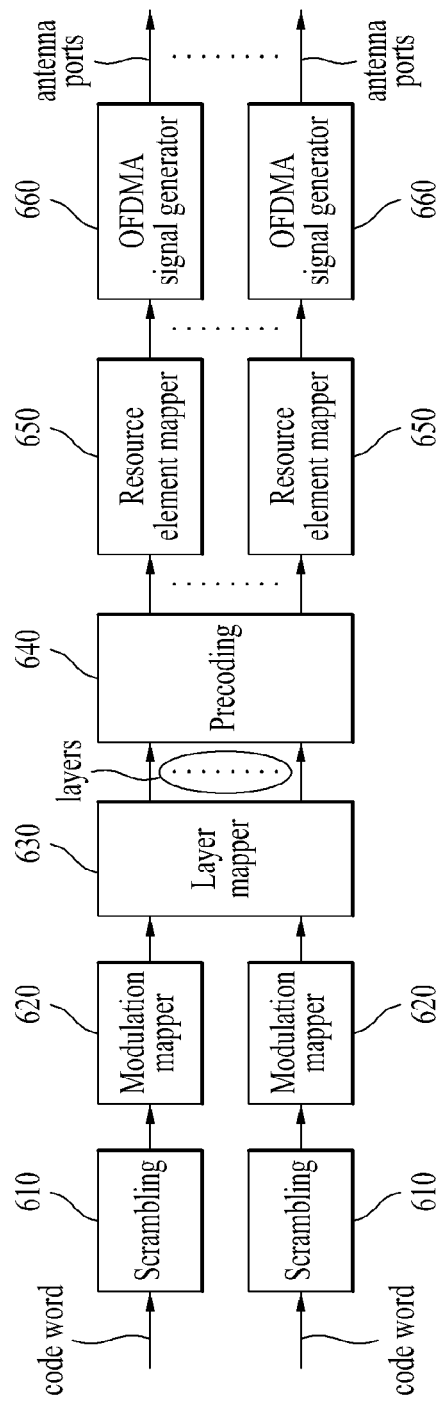
FIG. 6 illustrates a signal processing procedure through which a Bs transmits a downlink signal.

FIG. 6 illustrates a signal processing procedure through which a BS transmits a downlink signal.

Referring to FIG. 6, in a 3GPP LTE system, the BS may transmit one or more codewords on downlink. The codewords may be processed into complex symbols through a scrambling mode 610 and a modulation mapper 620 in the same manner as shown in FIG. 5. The complex symbols are mapped to multiple layers through a layer mapper 630 and each layer may be multiplied by a precoding matrix by a precoding module 640 and allocated to each Tx antenna. A transmission signal per antenna, processed in this manner, may be mapped to a time-frequency resource element through a resource element mapper 650 and transmitted through each antenna via an OFDM (orthogonal frequency division multiple access) signal generator 660.

When a UE transmits a signal on uplink in a wireless communication system, a peak-to-average ratio (PAPR) becomes a problem compared to signal transmission by a BS on downlink. Accordingly, uplink signal transmission uses single carrier-frequency division multiple access (SC-FDMA) while downlink signal transmission uses OFDMA as described above with reference to FIGS. 5 and 6. 3PP LTE employs SC-FDMA for uplink transmission. A low PAPR (or cubic metric (CM) can be maintained by using SC-FDMA.

Figure 7:
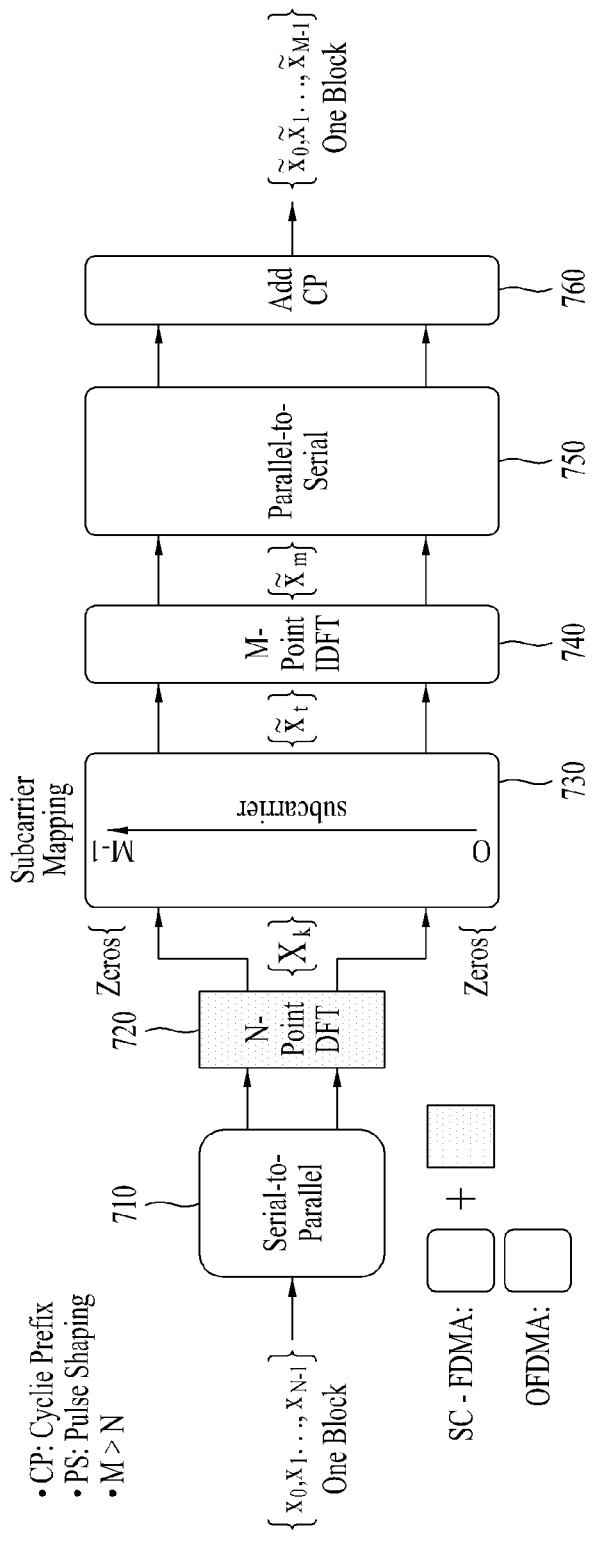
FIG. 7 illustrates SC-FDMA and OFDMA.

FIG. 7 illustrates SC-FDMA and OFDMA schemes.

3GPP employs OFDMA on downlink and uses SC-FDMA on uplink. Referring to FIG. 7, both a UE for transmitting an uplink signal and a BS for transmitting a downlink signal include a serial-to-parallel converter 710, a subcarrier mapper 730, an M-point IDFT module 740, and a cyclic prefix (CP) adder 760. The UE for transmitting a signal according to SC-FDMA additionally includes an N-point DFT module 720. The N-point DFT module 720 offsets the influence of IDFT processing of the M-point IDFT module 740 such that a transmitted signal has single carrier property.

Figure 8A:
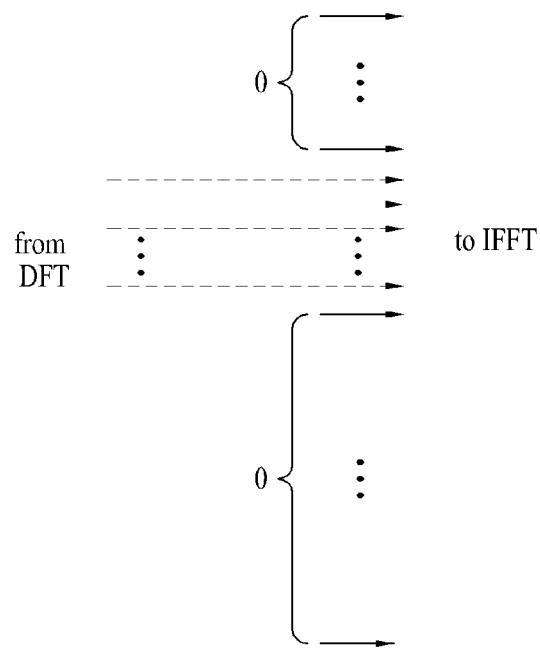
FIGS. 8a and 8b illustrate signal mapping schemes in the frequency domain to satisfy a single carrier property in the frequency domain.
Figure 8B:
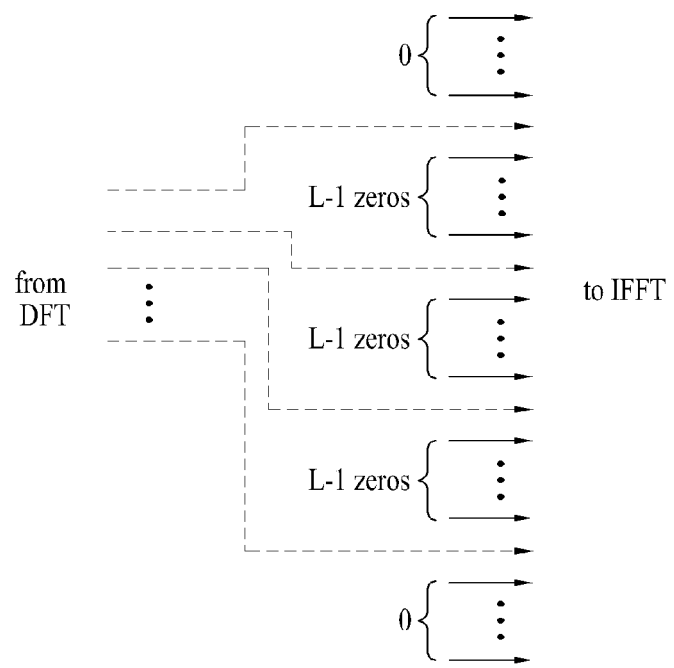

FIGS. 8a and 8b illustrate signal mapping schemes in the frequency domain to satisfy the single carrier property in the frequency domain.

FIG. 8a illustrates localized mapping and FIG. 8b illustrates distributed mapping.

A description will be given of clustered SC-FDMA which is a modification of SC-FDMA. Clustered SC-FDMA divides DFT process output samples into sub-groups in a subcarrier mapping process and non-contiguously maps the sub-groups in the frequency domain (or subcarrier region).

Figure 9:
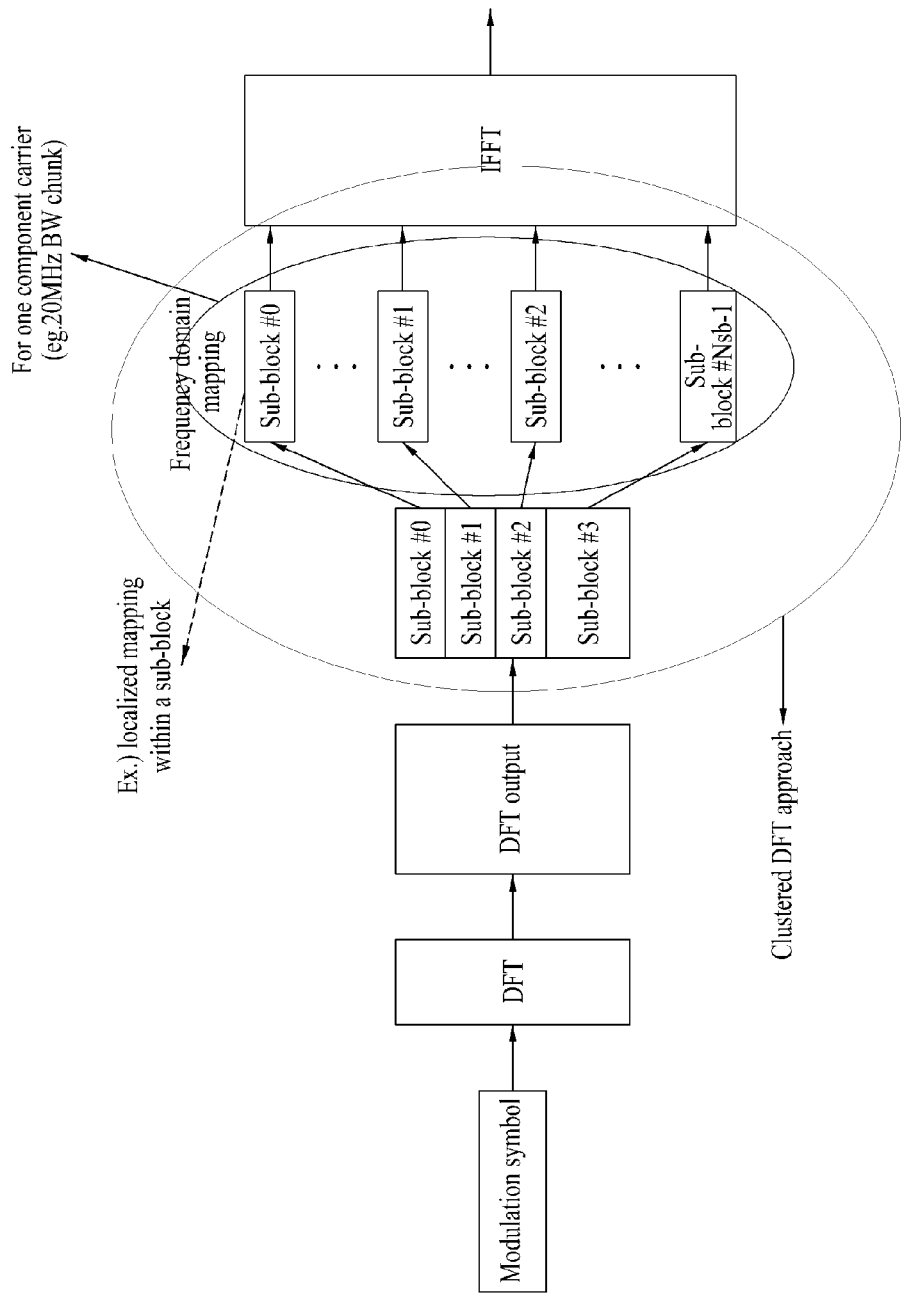
FIG. 9 illustrates a signal processing procedure through which DFT process output samples are mapped to a single carrier in clustered SC-FDMA.

FIG. 9 illustrates a signal processing procedure for mapping DFT process output samples to a single carrier in clustered SC-FDMA.

Figure 10A:
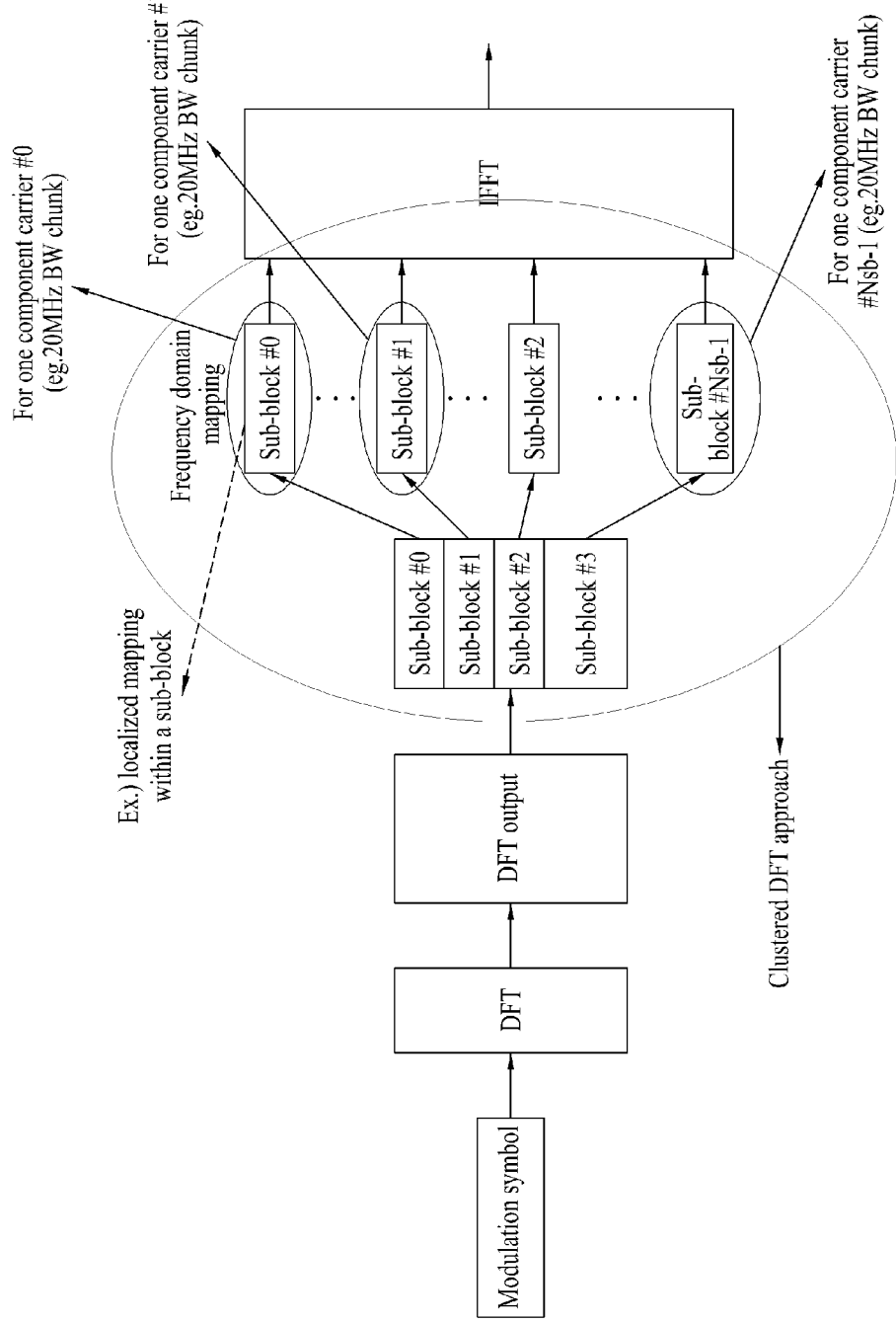
FIGS. 10A and 10B illustrate signal processing procedures through which DFT process output samples are mapped to multiple carriers in clustered SC-FDMA.
Figure 10B:
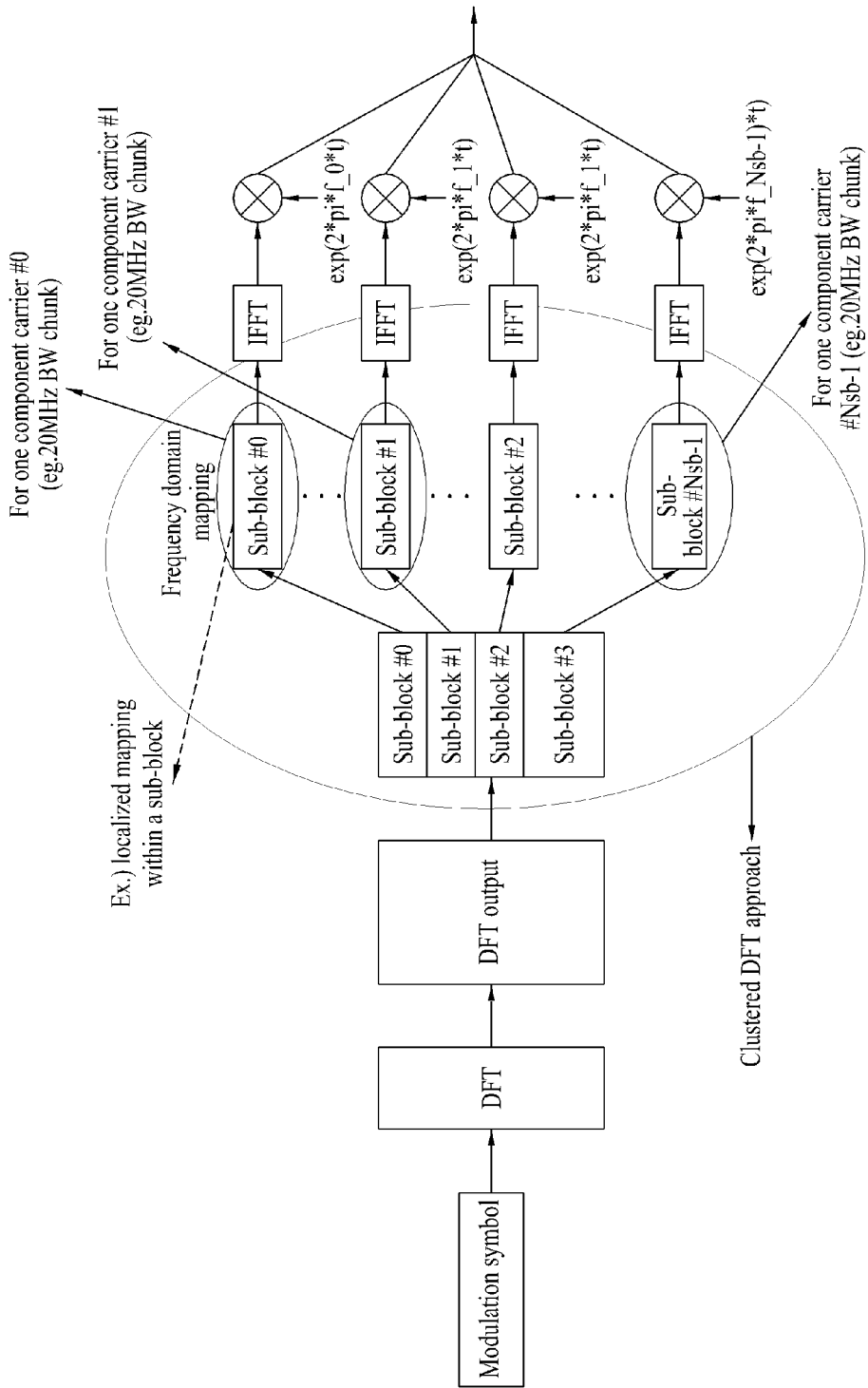

FIGS. 10A and 10B illustrate signal processing procedures for mapping DFT process output samples to multiple carriers in clustered SC-FDMA.

FIG. 9 shows an example of application of intra-carrier clustered SC-FDMA while FIGS. 10A and 10B show examples of application of inter-carrier clustered SC-FDMA. FIG. 10A illustrates a case in which a signal is generated through a single IFFT block when subcarrier spacing between neighboring component carriers is set while component carriers are contiguously allocated in the frequency domain. FIG. 10B shows a case in which a signal is generated through a plurality of IFFT blocks when component carriers are non-contiguously allocated in the frequency domain.

FIG. 11 illustrates a signal processing procedure in segmented SC-FDMA.

Segmented SC-FDMA is a simple extension of the DFT spreading and IFFT subcarrier mapping structure of the conventional SC-FDMA, when the number of DFT blocks is equal to the number of IFFT blocks and thus the DFT blocks and the IFFT blocks are in one-to-one correspondence. While the term 'segmented SC-FDMA' is adopted herein, it may also be called NxSC-FDMA or NxDFT-s-OFDMA. Referring to FIG. 11, the segmented SC-FDMA is characterized in that total time-domain modulation symbols are divided into N groups (N is an integer larger than 1) and a DFT process is performed on a group-by-group basis to relieve the single carrier property constraint.

A description will be given of PUCCH formats and uplink Tx power of a UE defined in LTE Release-8. A PUCCH carries uplink control information. In LTE, a UE cannot simultaneously transmit the PUCCH and a PUSCH due to single carrier property. In LTE-A, however, the UE may simultaneously transmit the PUCCH and the PUSCH in a specific component carrier (e.g. primary component carrier or PCell) due to introduction of multi-carrier. The PUCCH supports multiple formats and PUCCH formats supported by LTE Release-8 are shown in Table 5. PUCCH formats 2a and 2b support normal CP only.

TABLE 5

| PUCCH format | Modulation scheme | Number of bits per subframe, $M_{bit}$ |
|---|---|---|
| 1 | N/A | N/A |
| 1a | BPSK | 1 |

TABLE 5-continued

| PUCCH format | Modulation scheme | Number of bits per subframe, $M_{bit}$ |
|---|---|---|
| 1b | QPSK | 2 |
| 2 | QPSK | 20 |
| 2a | QPSK + BPSK | 21 |
| 2b | QPSK + QPSK | 22 |

Equation 1 represents uplink power for uplink control channel transmission of a UE in LTE Release-8 in dBm.

$$P_{PUCCH}(i) = \min\{P_{CMAX}, P_{0\_PUCCH} + PL + h(n_{CQI}, n_{HARQ}) + \Delta_{F\_PUCCH}(F) + g(i)\}$$ [Equation 1]

Here, i indicates a subframe index, $P_{CMAX}$ represents maximum Tx power of the UE, $P_{O\_PUCCH}$ is a parameter including the sum of cell-specific parameters and is signaled by a BS through higher layer signaling, PL is a downlink pathloss (or signal loss) estimate calculated in dB by the UE and is represented as PL=referenceSignalPower-higher layer filteredRSRP. In addition, h(n) is a value varying according to PUCCH format, $n_{CQI}$ is number information bit for channel quality information (CQI) and $n_{HARQ}$ indicates the number of HARQ bits. $\Delta_{F\_PUCCH}(F)$ is a relative value for PUCCH format 1a, corresponds to PUCCH format (F) and is signaled by the BS through higher layer signaling, and g(i) indicates a current PUCCH power control adjustment state of a subframe with index i. Furthermore, $h(n_{CQI}, n_{HARQ})$ is 0 in PUCCH formats 1, 1a and 1b and can be represented by Equation 2 in the case of normal CP.

$$h(n_{CQI}, n_{HARQ}) = \begin{cases} 10\log_{10}\left(\frac{n_{CQI}}{4}\right) & \text{if } n_{CQI} \geq 4 \\ 0 & \text{otherwise} \end{cases}$$ [Equation 2]

Table 6 shows $\delta_{PUCCH}$ mapped to TPC command fields in DCI formats 1A/1B/1D/1/2A/2/3 and Table 7 shows $\delta_{PUCCH}$ mapped to TPC command fields in DCI format 3A. Here, $\delta_{PUCCH}$ represents a UE-specific correction value (or power correction value).

TABLE 6

| TPC command field in DCI format 1A/1B/1D/1/2A/2/3 | $\delta_{PUCCH}$ [dB] |
|---|---|
| 0 | −1 |
| 1 | 0 |
| 2 | 1 |
| 3 | 3 |

TABLE 7

| TPC Command Field in DCI format 3A | $\delta_{PUCCH}$ [dB] |
|---|---|
| 0 | −1 |
| 1 | 1 |

A description will be given of PUCCH format 3. In the following figures and embodiments, a subframe/slot level UCI/RS symbol structure applied to PUCCH format 3 is described. The subframe/slot level UCI/RS symbol structure uses a UCI/RS symbol structure of PUCCH format 1 (normal CP) of LTE. However, the subframe/slot level UCI/RS symbol structure in PUCCH format 3 is exemplary and is not limited thereto. In PUCCH format 3, the number and positions of UCI/RS symbols may be modified according to system design. For example, PUCCH format 3 according to an embodiment of the present invention may be defined using the RS symbol structure of PUCCH format 2/2a/2b of LTE.

PUCCH format 3 may be used to transmit uplink control information of an arbitrary type/size. For example, PUCCH format 3 can be used to transmit information such as HARQ ACK/NACK, CQI, PMI, RI, SR, etc. which may have a payload of an arbitrary size. PUCCH format 3 according to the present invention is used to transmit ACK/NACK information in the following figures and embodiments for convenience.

FIGS. 12A to 12F illustrate PUCCH format 3 and signal processing procedures for the same.

Figure 12A:
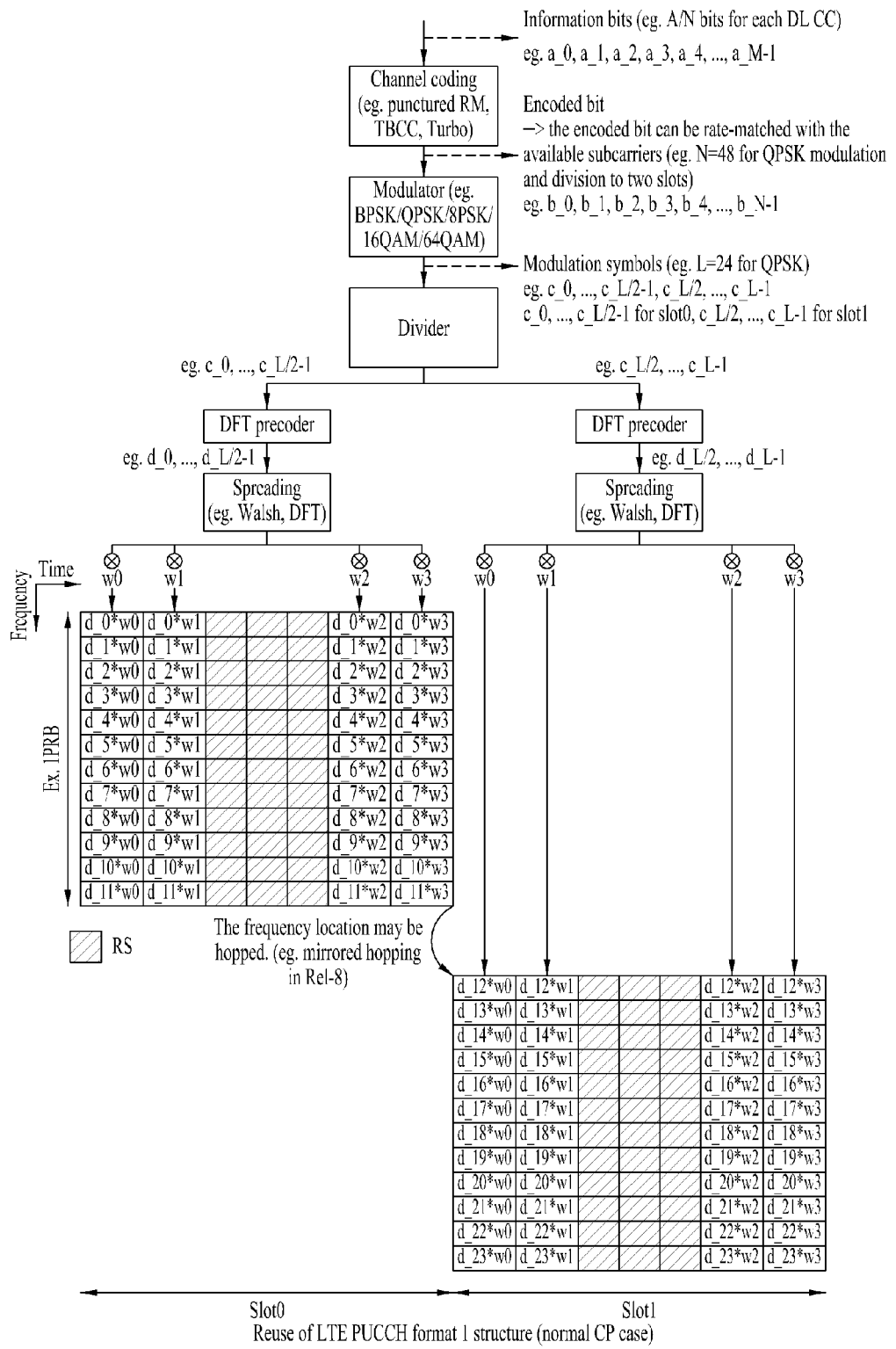
FIGS. 12A to 12F illustrate the structure of PUCCH format 3 and signal processing procedures for the same.

FIG. 12A illustrates a case in which PUCCH format 3 is applied to PUCCH format 1 (normal CP).

Referring to FIG. 12A, a channel coding block channel-encodes information bits a_0, a_1, . . . , a_M−1 (e.g. multiple ACK/NACK bits), thus creating coded bits (encoded bit or coding bit) (or codeword), b_0, b_1, . . . , b_N−1. M is the size of information bits and N is the size of coded bits. The information bits include uplink control information (UCI), for example, multiple ACKs/NACKs for a plurality of data (or PDSCHs) received on a plurality of DL CCs. Herein, the information bits a_0, a_1, . . . , a_M−1 are jointly encoded irrespective of the type/number/size of UCI that forms the information bits. For example, when the information bits include multiple ACKs/NACKs for a plurality of DL CCs, channel coding is performed on the entire bit information, rather than per DL CC or per ACK/NACK bit. A single codeword is generated by channel coding. Channel coding includes, without being limited to, repetition, simplex coding, RM coding, punctured RM coding, Tail-Biting Convolutional Coding (TBCC), Low-Density Parity-Check (LDPC) coding, or turbo coding. While not shown, the coded bits may be rate-matched, taking into account modulation order and the amount of resources. The rate matching function may be incorporated into the channel coding block or implemented in a separate functional block.

A modulator generates modulation symbols c_0, c_1, . . . , c_L−1 by modulating the coded bits b_0, b_1, . . . , b_M−1. L is the size of modulation symbols. The modulation scheme may be n-Phase Shift Keying (n-PSK) or n-Quadrature Amplitude Modulation (QAM) (n is an integer of 2 or greater). More specifically, the modulation scheme may be BPSK, QPSK, 8-PSK, QAM, 16-QAM, or 64-QAM.

A divider divides the modulation symbols c_0, c_1, . . . , c_L−1 into slots. The order/pattern/scheme of dividing modulation symbols into slots is not limited to a specific one. For instance, the divider may divide the modulation symbols into slots, sequentially starting from the first modulation symbol. In this case, the modulation symbols c_0, c_1, . . . , c_L/2−1 may be allocated to slot 0 and the modulation symbols c_L/2, c_L/2+1, . . . , c_L−1 may be allocated to slot 1, as shown in FIG. 30. When the modulation symbols are allocated to the slots, they may be interleaved (or permuted). For example, even-numbered modulation symbols may be allocated to slot 0 and odd-numbered modulation symbols may be allocated to slot 1. Division may precede modulation.

A DFT precoder performs DFT precoding (e.g. 12-point DFT) on the modulation symbols allocated to the slots in order to generate a single carrier waveform. Referring to FIG. 12A, the modulation symbols $c\_0, c\_1, \ldots, c\_L/2-1$ allocated to slot 0 are DFT-precoded to DFT symbols $d\_0, d\_1, \ldots, d\_L/2-1$ and the modulation symbols $c\_L/2, c\_L/2+1, \ldots, c\_L-1$ allocated to slot 1 are DFT-precoded to DFT symbols $d\_L/2, d\_L/2+1, \ldots, d\_L-1$. DFT precoding may be replaced with another linear operation (e.g. Walsh precoding).

A spreading block spreads DFT signals at an SC-FDMA symbol level (in the time domain). The SC-FDMA symbol-level time-domain spreading is performed using a spreading code (sequence). The spreading code includes a quasi-orthogonal code and an orthogonal code. The quasi-orthogonal code includes, without being limited to, a PN (Pseudo Noise) code. The orthogonal code includes, without being limited to, a Walsh code and a DFT code. While an orthogonal code is taken as a main example of the spreading code herein for convenience, the orthogonal code may be replaced with a quasi-orthogonal code. The maximum value of a spreading code size (or a Spreading Factor (SF)) is limited by the number of SC-FDMA symbols used to transmit control information. For example, if four SC-FDMA symbols carry control information in one slot, an orthogonal code of length 4, w0, w1, w2, w3 can be used in each slot. The SF means the degree to which control information is spread. The SF may be related to the multiplexing order or antenna multiplexing order of a UE. The SF may be changed to 1, 2, 3, 4, . . . depending on system requirements. An SF may be predefined between a BS and a UE or the BS may indicate an SF to the UE by DCI or RRC signaling. For example, if one of SC-FDMA symbols for control information is punctured to transmit an SRS, a spreading code with a decreased SF (e.g. SF=3 instead of SF=4) may be applied to the control information in a corresponding slot.

A signal generated from the above operation is mapped to subcarriers in a PRB and converted to a time-domain signal by IFFT. A CP is added to the time-domain signal and the resulting SC-FDMA symbols are transmitted through an RF end.

Each process will now be described in detail on the assumption that ACK/NACK for 5 DL CCs is transmitted. When each DL CC can transmit 2 PDSCHs, ACK/NACK bits therefor may be 12 bits when DTX is included. A coding block size (after rate matching) may be 48 bits when it is assumed that QPSK and SF=4 time spreading are used. The coded bits are modulated into 24 QPSK symbols which are frequency-divided into two slots. 12 QPSK symbols are converted into 12 DFT symbols through DFT in each slot. The 12 DFT symbols in each slot is spread into 4 SC-FDMA symbols using a spreading code with SF=4 and mapped in the time domain. A coding rate is 0.0625 (=12/192) since 12 bits are transmitted through [2 bits*12 subcarriers*8 SC-FDMA symbols]. When SF=4, a maximum of 4 UEs can be multiplexed per PRB.

The signal processing procedure described with reference to FIG. 12A is exemplary and the signal mapped to the PRB in FIG. 12A can be obtained through various equivalent signal processing procedures. Signal processing procedures equivalent to the signal processing procedure illustrated in FIG. 12A will now be described with reference to FIGS. 12B to 12F.

Figure 12B:
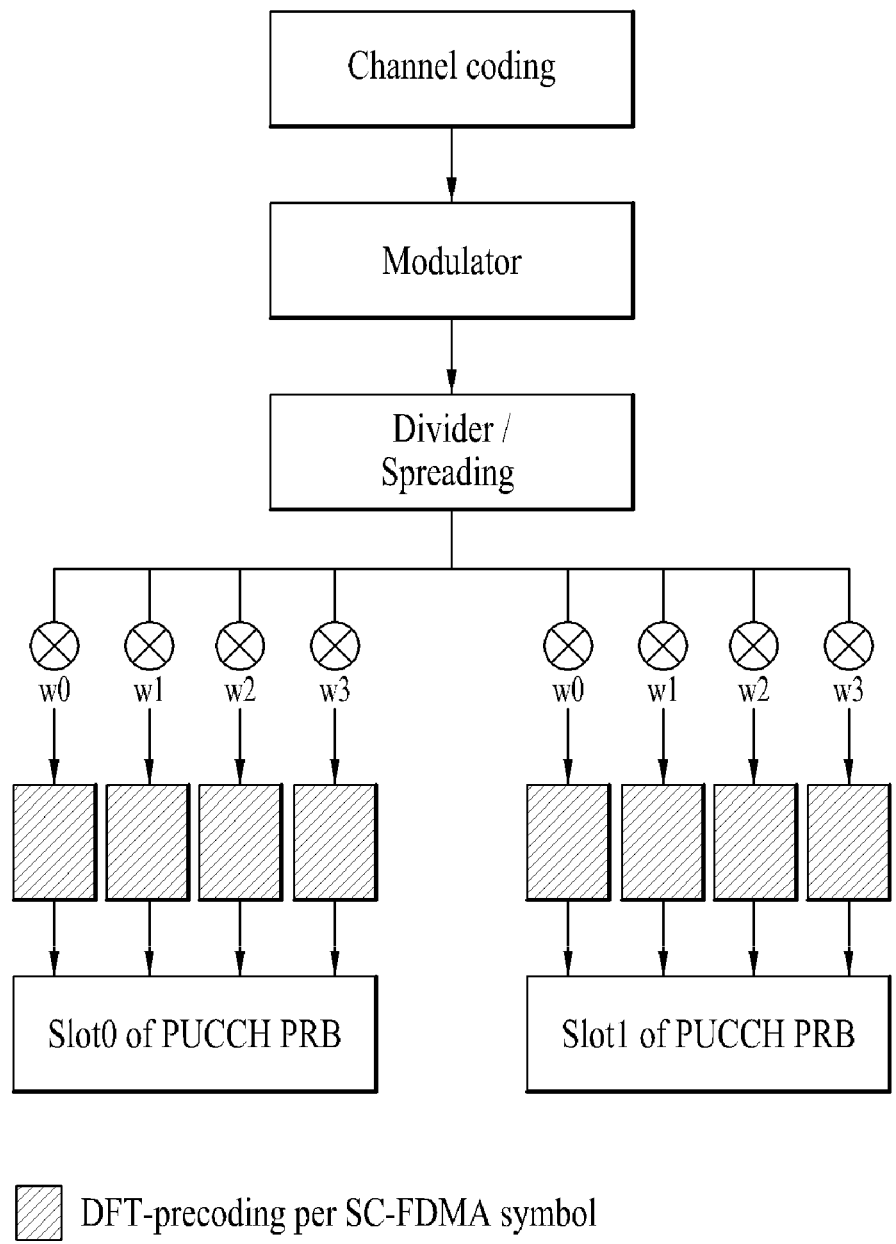

FIG. 12B illustrates a signal processing procedure in which operations of the DFT precoder and spreading block of FIG. 12A are changed. Since the function of the spreading block is to multiply a DFT symbol stream output from the DFT precoder by a specific constant at an SC-FDMA symbol level in FIG. 12A, the signal mapped to the SC-FDMA symbols is not changed even if the operations of the spreading block and the DFT precoder are changed. Accordingly, the signal processing procedure for PUCCH format 3 can be performed in the order of channel coding, modulation, frequency division, spreading and DFT precoding. In this case, frequency division and spreading can be performed by one functional block. For example, the modulation symbols can be alternately divided into the respective slots and, at the same time, can be spread at the SC-FDMA symbol level. Alternatively, the modulation symbols can be copied such that the modulation symbols correspond to the spreading code size when the modulation symbols are divided into the respective symbols and one-to-one multiplied by elements of the spreading code. Accordingly, the modulation symbol stream generated per slot is spread into a plurality of SC-FDMA symbols at the SC-FDMA symbol level. Then, a complex symbol stream corresponding to SC-FDMA symbols are DFT-precoded on an SC-FDMA symbol basis.

Figure 12C:
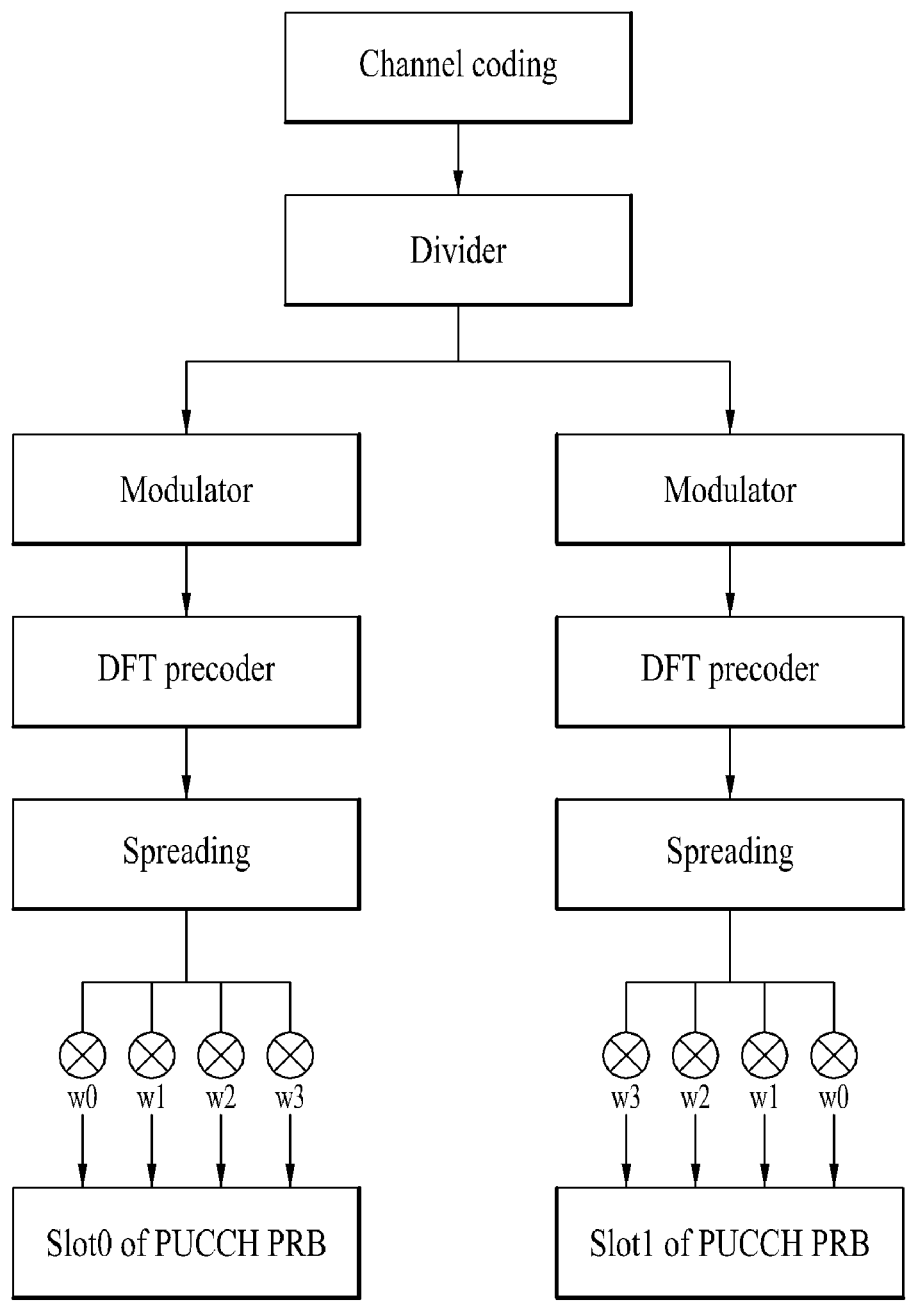

FIG. 12C illustrates a signal processing procedure in which operations of the modulator and divider of FIG. 12A are changed. Accordingly, the signal processing procedure for PUCCH format 3 can be performed in such a manner that joint channel coding and division are performed on a subframe basis and modulation, DFT precoding and spreading are sequentially performed on a slot basis.

Figure 12D:
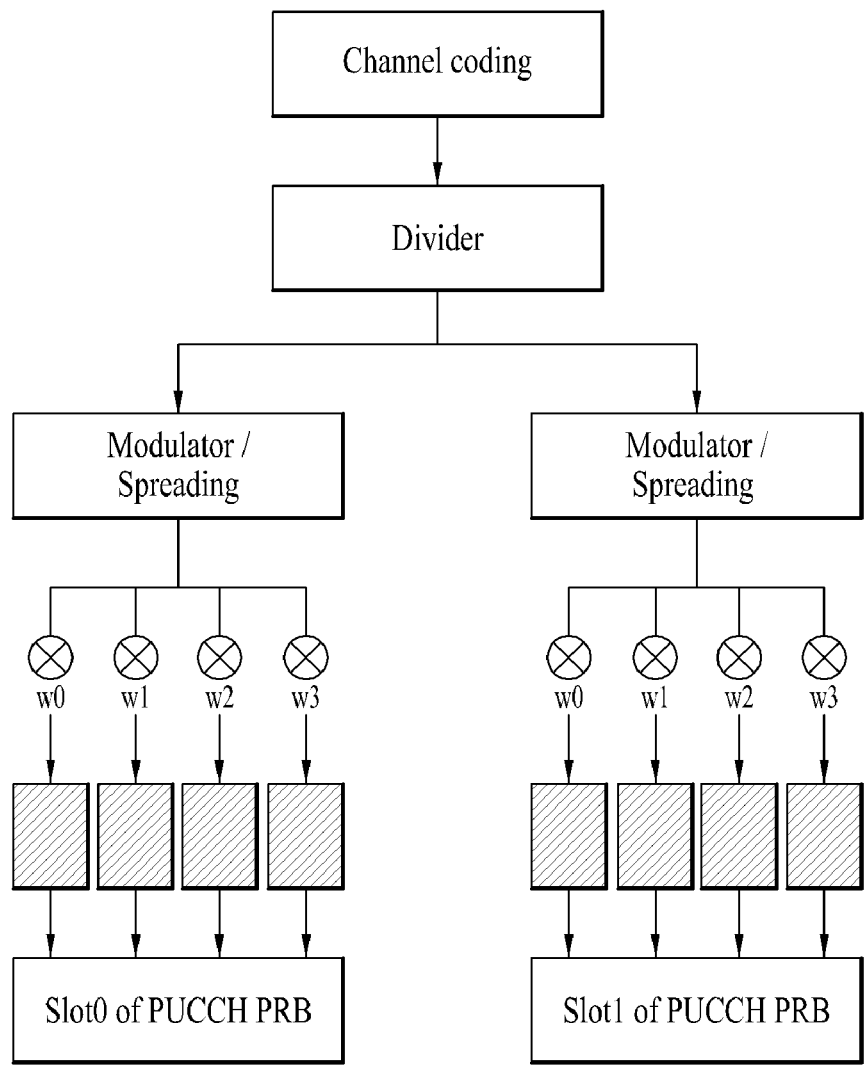

FIG. 12D illustrates a signal processing procedure in which operations of the DFT precoder and the spreading block of FIG. 12A are changed. As described above, since the function of the spreading block is to multiply a DFT symbol stream output from the DFT precoder by a specific constant at an SC-FDMA symbol level, the signal mapped to the SC-FDMA symbols is not changed even if the operations of the spreading block and the DFT precoder are changed. Accordingly, the signal processing procedure for PUCCH format 3 is performed in such a manner that joint channel coding and division are performed on a subframe basis and modulation is carried out on a slot basis. A modulation symbol stream generated per slot is spread into a plurality of SC-FDMA symbols at the SC-FDMA symbol level, and a modulation symbol stream corresponding to SC-FDMA symbols is DFT-precoded on an SC-FDMA symbol basis. In this case, modulation and spreading can be performed by one functional block. For example, modulation symbols can be directly spread at the SC-FDMA symbol level while the coding bit is modulated. Alternatively, modulation symbols, generated when the coding bit is modulated, can be copied such that the modulation symbols correspond to the spreading code size and one-to-one multiplied by elements of the spreading code.

Figure 12E:
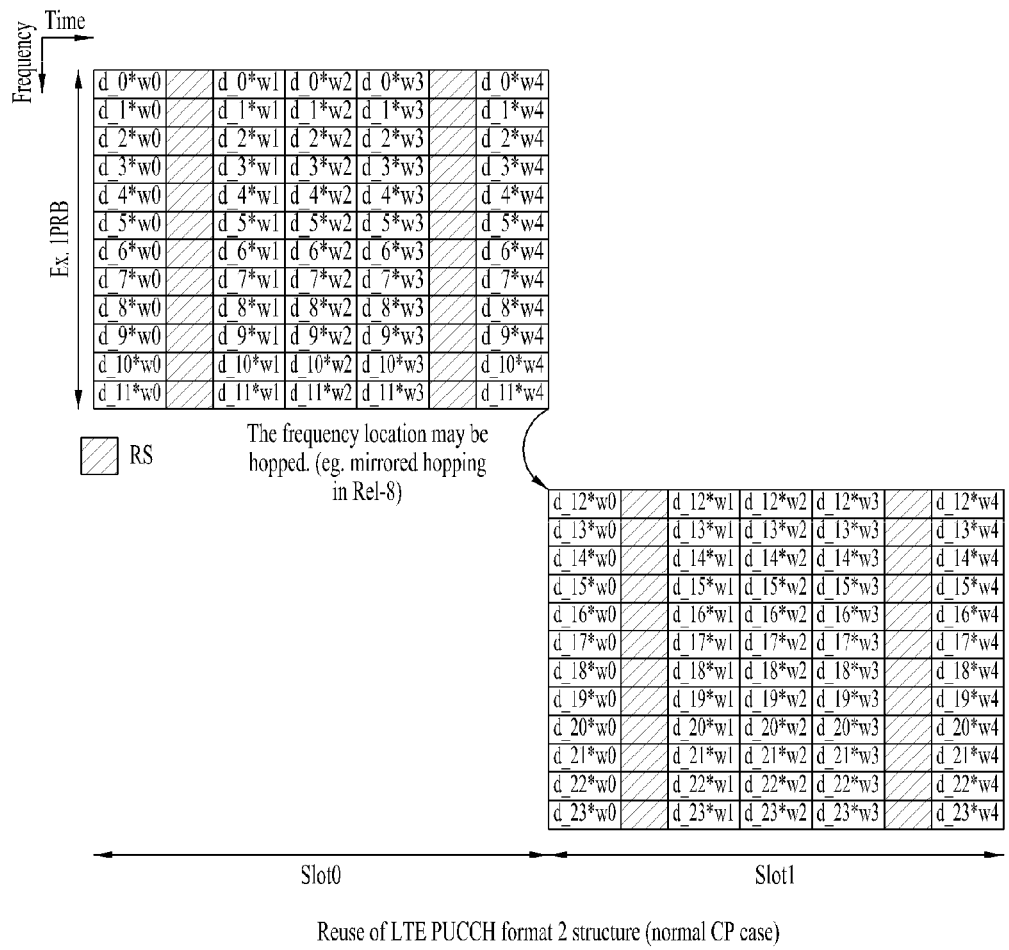
Figure 12F:
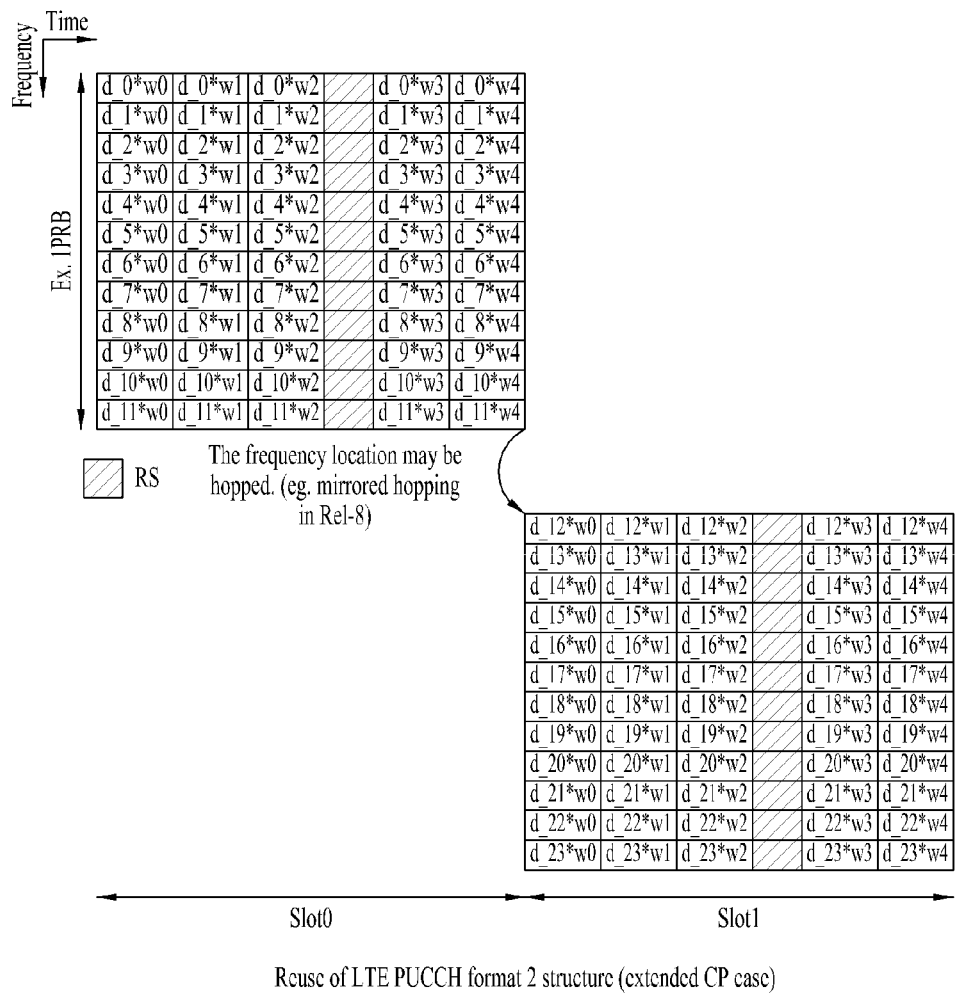

FIG. 12E illustrates a case in which PUCCH format 3 is applied to PUCCH format 2 (normal CP) and FIG. 12F illustrates a case in which PUCCH format 3 is applied to PUCCH format 2 (extended CP). Basic signal processing procedures illustrated in FIGS. 12E and 12F correspond to those described above with reference to FIGS. 12A to 12D. However, the numbers/positions of UCI SC-FDMA symbols and RS SC-FDMA symbols are changed, compared to FIG. 12A, since PUCCH format 2 is reused.

Table 8 shows RS SC-FDMA symbol position in PUCCH format 3. It is assumed that the number of SC-FDMA symbols in a slot is 7 (indices 0 to 6) in the case of normal CP and 6 (indices 0 to 5) in the case of extended CP.

TABLE 8

| | RS SC-FDMA symbol position | | |
|---|---|---|---|
| | Normal CP | Extended CP | Remark |
| PUCCH format 3 | 2, 3, 4 | 2, 3 | PUCCH format 1 is reused. |
| | 1, 5 | 3 | PUCCH format 2 is reused. |

Tables 9 and 10 show spreading codes based on SF. Table 9 shows DFT codes with SF=5 and SF=3 and Table 10 shows Walsh codes with SF=4 and SF=2. A DFT code is an orthogonal code represented as $\bar{w}_m = [w_0\ w_1\ \ldots\ w_{k-1}]$, where $w_k = \exp(j2\pi km/SF)$. Here, k orthogonal code represented as indicates the size or SF of the DFT code and m=0, 1, ..., SF-1. The following tables show a case in which m is used as an index for the orthogonal code.

TABLE 9

| | Orthogonal code $\bar{w}_m = [w_0\ w_1\ \ldots\ w_0]$ | |
|---|---|---|
| Index m | SF = 5 | SF = 3 |
| 0 | [1 1 1 1 1] | [1 1 1] |
| 1 | [1 $e^{j2\pi/5}$ $e^{j4\pi/5}$ $e^{j6\pi/5}$ $e^{j8\pi/5}$] | [1 $e^{j2\pi/3}$ $e^{j4\pi/3}$] |
| 2 | [1 $e^{j4\pi/5}$ $e^{j8\pi/5}$ $e^{j2\pi/5}$ $e^{j6\pi/5}$] | [1 $e^{j4\pi/3}$ $e^{j2\pi/3}$] |
| 3 | [1 $e^{j6\pi/5}$ $e^{j2\pi/5}$ $e^{j8\pi/5}$ $e^{j4\pi/5}$] | — |
| 4 | [1 $e^{j8\pi/5}$ $e^{j6\pi/5}$ $e^{j4\pi/5}$ $e^{j2\pi/5}$] | — |

TABLE 10

| | Orthogonal code | |
|---|---|---|
| Index m | SF = 4 | SF = 2 |
| 0 | [+1 +1 +1 +1] | [+1 +1] |
| 1 | [+1 −1 +1 −1] | [+1 −1] |
| 2 | [+1 +1 −1 −1] | |
| 3 | [+1 −1 −1 +1] | |

The code index m may be predetermined or signaled by a BS. For example, the code index m can be implicitly linked to a CCE index (e.g. smallest CCE index) corresponding to a CCE constituting a PDCCH. In addition, the code index m may be explicitly designated through a PDCCH or RRC signaling. Furthermore, the code index m may be inferred from a value designated through a PDCCH or RRC signaling. The code index m may be independently provided for each subframe, each slot or a plurality of SC-FDMA symbols. The code index m may be preferably changed per subframe or slot or for a plurality of SC-FDMA symbols. That is, the code index m may be hopped in units of predetermined period.

For inter-cell interference randomization, cell-specific scrambling using a scrambling code (e.g. PN code such as gold code) corresponding to a PCI (physical cell ID) or UE-specific scrambling using a scrambling code corresponding to a UE ID (e.g. RNTI) may be additionally applied, which is not shown. Scrambling may be performed for all information, performed for intra-SC-FDMA symbol or inter-SC-FDMA symbols or for both of them. Scrambling for all information can be implemented by performing scrambling at information bit level, coding bit level and modulation symbol level prior to frequency division. Intra-SC-FDMA symbol scrambling can be achieved by carrying out scrambling at modulation symbol level or DFT symbol level after frequency division. Inter-SC-FDMA symbol scrambling can be achieved by performing scrambling at Sc-FDMA symbol level in the time domain after spreading.

It is possible to promote UE multiplexing by applying CDM to a single output from the block prior to the DFT precoder. For example, CDM can be implemented through circular shift or cyclic shift or Walsh (or DFT) spreading since the signal output from the block prior to the DFT precoder is a time domain signal. CDM can be performed at one of the information bit level, coding bit level and modulation symbol level. Specifically, in a case in which 2 UEs are multiplexed to one SC-FDMA symbol using Walsh codes with SF=2, a complex signal of $a_0\ a_1\ a_2\ a_3\ a_4\ a_5$ is generated when coding bits are 12 bits and QPSK is performed. Control information of the UEs is spread using Walsh codes of [+1 +1] and [+1 −1] as follows.

UE#0: [+1 +1] is applied and $a_0\ a_1\ a_2\ a_3\ a_4\ a_5\ a_0\ a_1\ a_2\ a_3\ a_4\ a_5$ are transmitted.

UE#1: [+1 −1] is applied and $a_0\ a_1\ a_2\ a_3\ a_4\ a_5\ -a_0\ -a_1\ -a_2\ -a_3\ -a_4\ -a_5$ are transmitted.

In this case, interleaving may be additionally performed. Interleaving may be applied before or after spreading. An example to which both spreading and interleaving are applied is as follows.

UE#0: [+1 +1] is applied and $a_0\ a_0\ a_1\ a_1\ a_2\ a_2\ a_3\ a_3\ a_4\ a_4\ a_5\ a_5$ are transmitted.

UE#1: [+1 −1] is applied and $a_0, -a_0, a_1, -a_1, a_2, -a_2, a_3, -a_3, a_4, -a_4, a_5, -a_5$ are transmitted.

Upon spreading and/or interleaving prior to the DFT precoder, the generated signal is DFT-precoded (and additionally time-spread at the SC-FDMA symbol level as necessary) and then mapped to subcarriers of corresponding Sc-FDMA symbols.

A description will be given of a method for transmitting a PUCCH using a multi-antenna transmission method in relation to PUCCH formats. While a 2Tx transmit diversity scheme will be described for convenience, the following example is equally/similarly applicable to an n-Tx transmit diversity scheme. A (quasi) orthogonal resource for control information transmission is referred to as resource A and a (quasi) orthogonal resource for RS transmission is referred to as resource B as assumed above. Logical indices of resource A and resource B may be linked to each other. For example, when the logical index of resource B is provided, the logical index of resource A can be automatically given. Physical configuration methods of the logical indices of resource A and resource B may be different from each other. The following two cases may be present.

(1) Control information can be transmitted through the same PRB via all antennas (antenna ports).
  A. The control information can be transmitted through two different resources A (e.g. Walsh or DFT codes with different indices) selected per antenna (port).
  B. An RS can be transmitted through two different resources B (e.g. combinations of a cyclic shift and a DFT cover) selected per antenna (port).

(2) The control information can be transmitted different PRBs via respective antennas. For example, the control information can be transmitted through PRB#4 via antenna (port) #0 and transmitted through PRB#6 via antenna (port) #1.
  A. Resources are not limited for control information pieces transmitted through different antennas (antenna ports) (that is, the control information pieces may be identical to or different from each other).

B. Resources are not limited between RSs transmitted through different antennas (antenna ports) (that is, the RSs may be identical to or different from each other).

In multi-antenna transmission (e.g. 2Tx transmission), two resources A (e.g. orthogonal codes) for control information transmission and two resources B (e.g. combinations of a cyclic shift and a DFT cover) for RS transmission may be predetermined or provided through physical control channel (e.g. PDCCH)/RRC signaling. In this case, signaling for control information and signaling for RSs may be individually performed. When resource information for one antenna (port) is signaled, resource information for the other antenna (port) may be inferred from the pre-signaled resource information. For example, spreading code index m for control information may be predetermined or signaled by a BS. Otherwise, spreading code index m may be implicitly linked to a CCE index for a PDCCH. Spreading code index m may be explicitly designated through a PDCCH or RRC signaling. Furthermore, spreading code index m may be linked to an orthogonal code index or a cyclic shift index for an RS. Spreading code index m may be changed on a subframe-by-subframe basis, slot-by-slot basis or for multiple SC-FDMA symbols. That is, spreading code index m may be hopped based on a predetermined period (e.g. a slot).

A description will be given of 2-resource based transmit diversity (TxD).

1. Single Carrier-Space Frequency Block Code (SC-SFBC) Scheme

SC-SFBC uses a single carrier and has low CM. When SC-SFBC is employed, orthogonality between UEs may be damaged while a high diversity gain is obtained. For example, a signal from antenna #1 of UE #0 and a signal from antenna #0 of UE #1 are not orthogonal to each other. Accordingly, SC-SFBC does not satisfy backward compatibility of LTE Release-8. In addition, resources assigned for the antennas are limited to the same physical resource block (PRB).

2. Space Time Block Code (STBC)-II Scheme

STBC-II uses a single carrier and has low CM like SC-SFBC. Orthogonality between UEs may be damaged while a high diversity gain is obtained in PUCCH format 1. This scheme has a problem that an unpaired symbol is generated in the case of a puncturing format for sounding reference signal (SRS) transmission in the second slot of a specific subframe.

In PUCCH format 2, orthogonality between UEs may be damaged while a high diversity gain is obtained. STBC-II has a problem that the last OFDM symbol in one slot of a specific subframe is unpaired. Resources assigned for the antennas are limited to the same PRB.

3. Frequency Switched Transmit Diversity (FSTD) Scheme

High CM transmission can be achieved when a length-12 computer generated (CG) sequence is used and low CM transmission can be achieved when a length-6 CG or Zadoff-Chu (ZC) sequence is used. FSTD is not suitable for PUCCH transmission.

4. Orthogonal Resource Transmission (ORT) Scheme

This scheme uses a single carrier, has low CM and can be used for both PUCCH format 1 and PUCCH format 2. ORT has a high transmit diversity gain and maintains orthogonality between UEs. Accordingly, ORT satisfies backward compatibility of LTE Release-8.

Figure 13:
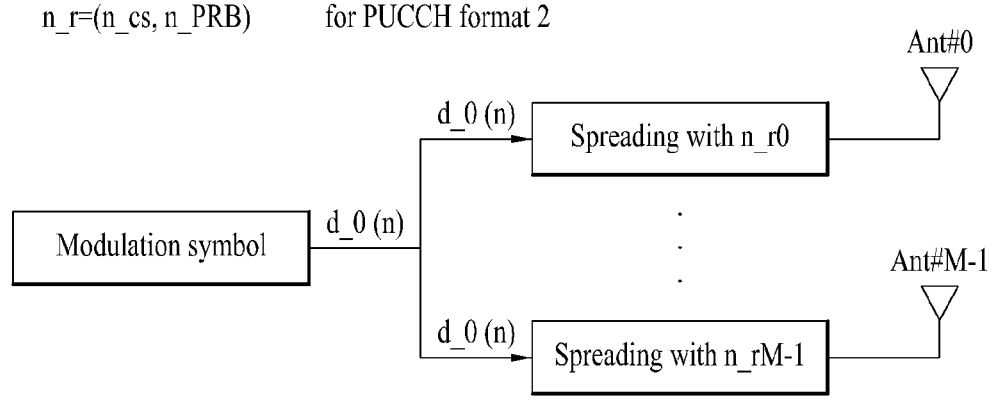
FIG. 13 illustrates orthogonal resource transmission (ORT)

FIG. 13 illustrates the ORT scheme.

Referring to FIG. 13, a modulation symbol is copied to each antenna port for spreading operation. Signals are transmitted through space-resource orthogonalization. Full spatial diversity gain can be obtained since the signals are transmitted through different resources on different channels. ORT refers to spatial orthogonal resource transmit diversity (SORTD) unless otherwise mentioned.

As illustrated in FIG. 13, d_0(n) increases to the number M of Tx antennas of the corresponding UE. For example, d_0(n) uses one resource when only one Tx antenna is present and d_0(n) uses two resources for which the same symbol d_0(n) may be present when two Tx antennas are provided. The number of d_0(n) may be increased to the number of antennas. In the present invention, the number of Tx antennas used for PUCCH transmission of the UE is 2.

As shown in FIG. 13, when the UE transmits an uplink control channel (e.g. PUCCH) through 2 Tx antennas (i.e. 2-antenna transmission), full spatial diversity gain is obtained to improve reception performance of a control channel (e.g. PUCCH format 1, PUCCH format 2 and PUCCH format 3 in LTE/LTE-A).

The following element is reflected in control channel power control for a case in which SORTD is applied to PUCCH format 3 transmission or the quantity of information therefor exceeds 11 bits and other cases.

For PUCCH format 3, h(n) can be represented as Equation 3 when the UE is configured by a higher layer to transmit a PUCCH through two antenna ports or the UE transmits HARQ-ACK/SR using bits exceeding 11 bits and as Equation 4 in other cases.

$$h(n_{CQI}, n_{HARQ}, n_{SR}) = \frac{n_{HARQ} + n_{SR} - 1}{3} \quad \text{[Equation 3]}$$

$$h(n_{CQI}, n_{HARQ}, n_{SR}) = \frac{n_{HARQ} + n_{SR} - 1}{2} \quad \text{[Equation 4]}$$

Here, $n_{CQI}$ indicates the number of information bits of CQI in a specific subframe, $n_{HARQ}$ represents the number of HARQ bits in the specific subframe, and $n_{SR}$ is 1 when the specific subframe is composed of an SR for a UE that does not have a transport block with respect to UL-SCH and 0 in other cases.

While Equations 3 and 4 are applied to a case in which the UE transmits PUCCH format 3 according to SORTD, h(n) in Equations 3 and 4 needs to be redefined when the UE transmits PUCCH format 3 using other diversity schemes instead of SORTD. In addition, while HARQ information and scheduling request (RS) are multiplexed, h(n) needs to be redefined when a combination of other control information is used.

FIGS. 14 to 17 show results of experiments on the above-described schemes and modifications thereof. The present invention proposes an uplink power control element for determining uplink Tx power in consideration of application of schemes other than SORTD applied to PUCCH format 3.

The uplink power control element h(n) for determining uplink Tx power, proposed by the present invention, can be used in the case in which SORTD and a diversity scheme other than SORTD are adaptively applied to divided periods according to the quantity of information on the basis of the quantity of basic information of PUCCH format 3 as well as a case in which a diversity scheme other than SORTD is used for PUCCH format 3 transmission.

FIGS. 14 to 17 show required SNR values according to the number of ACK/NACK bits when PUCCH format 3 is transmitted according to diversity schemes.

Figure 14:
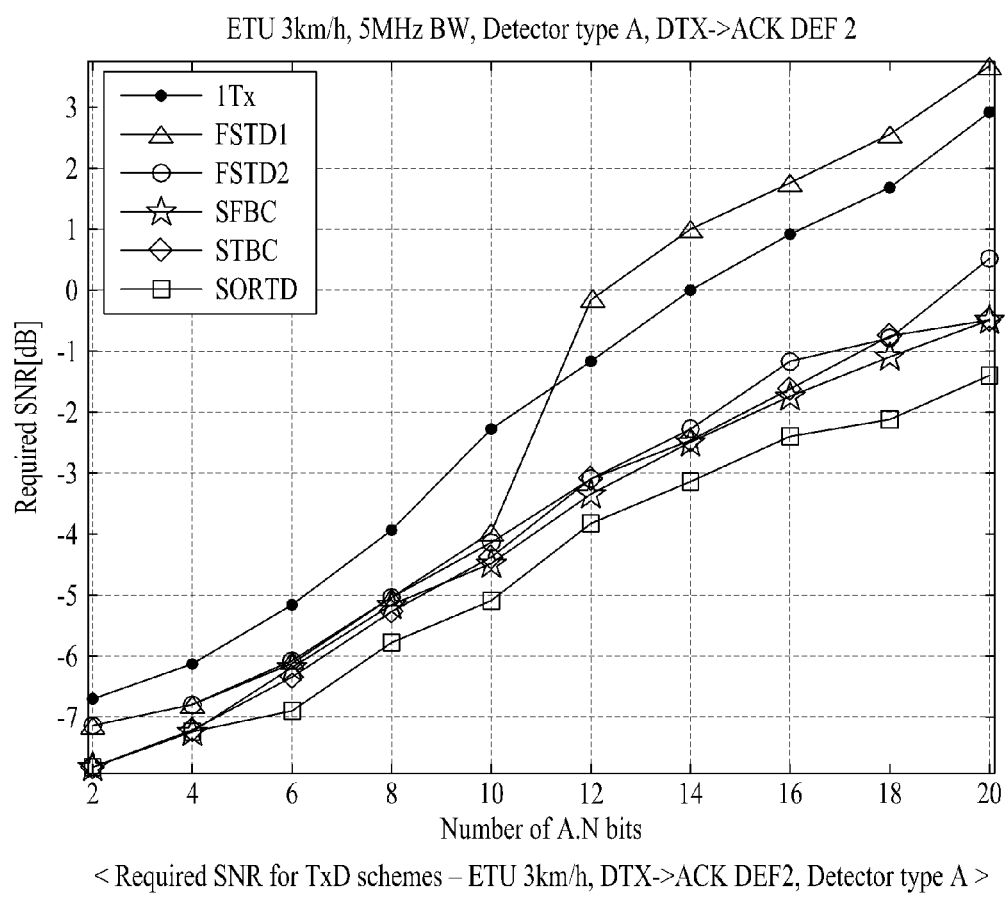
FIGS. 14 to 17 show signal-to-noise ratio (SNR) values based on the number of ACK/NACK bits when PUCCH format 3 is transmitted according to diversity scheme.

FIG. 14 shows required SNR according to the number of ACK/NACK bits in the case of extended typical urban (ETU) mobile speed pedestrian (3 Km/h), system bandwidth of 5 MHz, detector type A, and DTX corresponding to ACK DEF 2.

Figure 15:
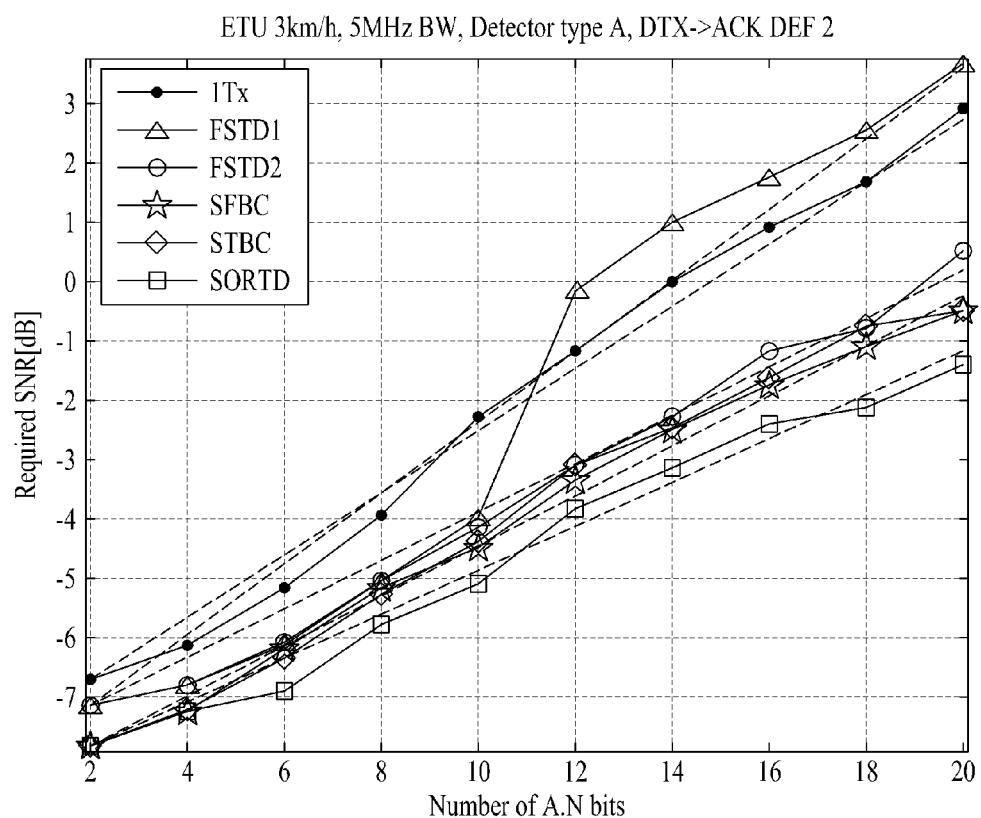

FIG. 15 shows an example of curve fitting with respect to FIG. 14. In FIG. 15, dotted lines are matched to corresponding solid lines. The following equations represent the dotted lines. As shown in FIG. 15, if curve fitting is applied to SORTD, SORTD=0.39 $n_{HARQ}$–8.7 is obtained. SFBC (STBC)=0.45 $n_{HARQ}$–9.0 is obtained for SFBC (STBC), FSTD1=0.43 $n_{HARQ}$–4.5 is obtained for FSTD1, and FSTD2=0.61 $n_{HARQ}$–12.0 is obtained for FSTD2.

Figure 16:
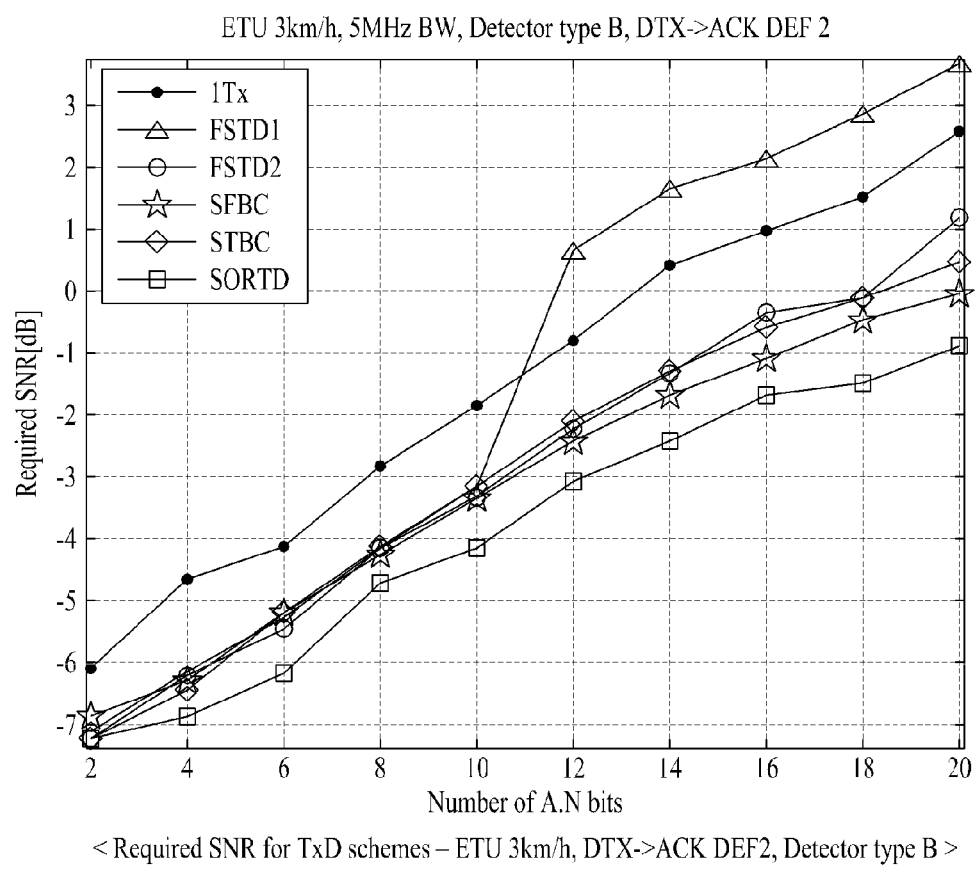

FIG. 16 shows required SNR according to the number of ACK/NACK bits in the case of ETU mobile speed pedestrian (3 Km/h), system bandwidth of 5 MHz, detector type B, and DTX corresponding to ACK DEF 2.

Figure 17:
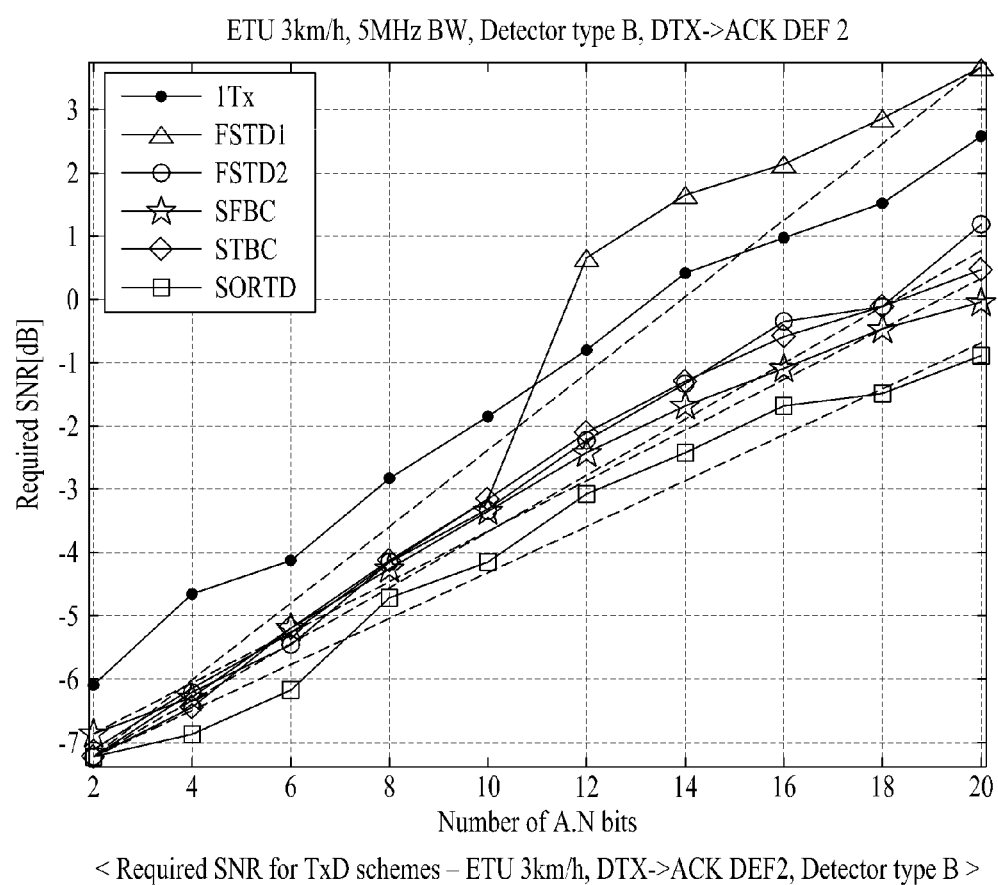

FIG. 17 shows an example of curve fitting with respect to FIG. 16. In FIG. 16, dotted lines are matched to corresponding solid lines. The following equations represent the dotted lines. As shown in FIG. 17, curve fitting is applied to SORTD, SORTD=0.35 $n_{HARQ}$–7.7 is obtained. SFBC=0.41 $n_{HARQ}$–7.0 is obtained for SFBC, STBC (FSTD2)=0.46 $n_{HARQ}$–8.2 is obtained for STBC (FSTD2), and FSTD1=0.43 $n_{HARQ}$–4.5 is obtained for FSTD1. The equations derived through curve fitting in FIGS. 15 and 17 are approximate and they are not limited thereto.

The following equation 5 relates to uplink power control for a PUCCH in LTE-A.

$$P_{PUCCH}(i) = \min \left\{ \begin{array}{l} P_{CMAX,c}(i), P_{0\_PUCCH} + PL_c + h(n_{CQI}, n_{HARQ}, n_{SR}) + \\ \Delta_{F\_PUCCH}(F) + \Delta_{TxD}(F') + g(i) \end{array} \right\}$$ [Equation 5]

[dBm]

Here, i is a subframe index, c is a cell index. When a UE is configured by a higher layer to transmit a PUCCH through two antenna ports, $\Delta_{TxD}(F')$ is provided to the UE by the higher layer and is 0 in other cases. Parameters other than $h(n_{CQI}, n_{HARQ}, n_{SR})$ correspond to those of Equation 1.

When diversity schemes other than SORTD are applied to PUCCH format 3 transmission based on the experimental results of FIGS. 14 to 17, $h(n_{CQI},n_{HARQ},n_{SR})$ (referred to as function h(n) hereinafter) needs to be redefined.

Furthermore, h(n) applied to PUCCH format 3 transmission needs to be set to meet signal power according to increase/decrease in the quantity of information of PUCCH format 3 since the quantity of information of PUCCH format 3 is variable.

Embodiment 1

When SFBC, STBC, FSTD or PVS (precoding vector switching across two slots in a subframe) is applied to PUCCH format 3 transmission, h(n) may be applied in the form of Equation 6.

$$h(n_{CQI}, n_{HARQ}, n_{SR}) = \frac{n_{HARQ} + n_{SR} - B}{A}$$ [Equation 6]

Here, A=[2, 3, 4, 5, 6, 7, 8, 9] and B=[1, 2, 3, 4, 5, 6, 7, 8, 9, 0].

It is possible to derive curve fitting equations with respect to the graphs of FIGS. 14 to 17 using Equation 6 by combining A and B.

For example, Equation 7 is obtained in the case of SFBC.

$$h(n_{CQI}, n_{HARQ}, n_{SR}) = \frac{n_{HARQ} + n_{SR} - 1}{2} \text{ or}$$ [Equation 7]

$$h(n_{CQI}, n_{HARQ}, n_{SR}) = \frac{n_{HARQ} + n_{SR} - 2}{2} \text{ or}$$

$$h(n_{CQI}, n_{HARQ}, n_{SR}) = \frac{n_{HARQ} + n_{SR} - 1}{4} \text{ or}$$

$$h(n_{CQI}, n_{HARQ}, n_{SR}) = \frac{n_{HARQ} + n_{SR} - 1}{4} \text{ or}$$

$$h(n_{CQI}, n_{HARQ}, n_{SR}) = \frac{n_{HARQ} + n_{SR} - 1}{8}$$

Equation 7 is applicable when a diversity scheme other than SORTD is used irrespective of the quantity of information of PUCCH format 3. Otherwise, a period is divided based on a predetermined quantity of information of PUCCH format 3, SORTD is applied to some periods and a diversity scheme other than SORTD is applied to the remaining periods.

For example, SFBC is applied and $$h(n_{CQI}, n_{HARQ}, n_{SR}) = \frac{n_{HARQ} + n_{SR} - 1}{4}$$

or $$h(n_{CQI}, n_{HARQ}, n_{SR}) = \frac{n_{HARQ} + n_{SR} - 1}{8}$$

is used when the quantity of information exceeds the predetermined quantity of information of PUCCH format 3, whereas SORTD is applied and $$h(n_{CQI}, n_{HARQ}, n_{SR}) = \frac{n_{HARQ} + n_{SR} - 1}{3}$$

is used when the quantity of information is less than the predetermined quantity of information of PUCCH format 3. Here, the predetermined quantity of information may be set to 11 bits. Single Reed-Muller (RM) coding scheme is used for 11 bits or less and dual RM is used for 11 bits or more. Otherwise, the predetermined quantity of information may be set based on performance.

Embodiment 2

It is necessary to redefine h(n) for periodic/aperiodic CSI and/or HARQ ACK/NACK and/or SR in PUCCH format 3. CSI (channel state information) includes a channel quality indicator (CQI), a precoding matrix indicator (PMI), a precoding type indicator (PTI) and/or a rank indicator (RI). A UE can report CSI to a BS periodically/aperiodically. The UE can transmit the CSI using a PUCCH in the case of periodic reporting and transmit the same through a PUSCH in the case of aperiodic reporting. Otherwise, the UE can report the CSI by combining periodic/aperiodic reporting and PUCCH/PUSCH. In this case, h(n) may be redefined as represented by Equation 8.

$$h(n_{CQI}, n_{HARQ}, n_{CSI}, n_{SR}) = \frac{n_{HARQ} + n_{CSI} + n_{SR} - D}{C} \quad \text{[Equation 8]}$$

Here, C=[2, 3, 4, 5, 6, 7, 8, 9] and D=[1, 2, 3, 4, 5, 6, 7, 8, 9, 0]. It is possible to derive curve fitting equations based on the experimental results shown in FIGS. 14 to 17 by combining C and D. Diversity schemes may be applied through a plurality of steps according to $n_{HARQ}$ and/or $n_{CSI}$. SORTD may be used or one of diversity schemes other than SORTD may be used. Alternatively, SORTD and a diversity scheme other than SORTD may be applied to periods according to the quantity of information of PUCCH format 3.

According to the above-described embodiments of the present invention, even when a UE applies a new transmit diversity scheme other than SORTD to PUCCH format 3, control channel transmit power control can be efficiently performed by considering a power element that reflects the new transmit diversity scheme.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A UE and method for controlling uplink Tx power are applicable to various communication systems such as 3GPP LTE, LTE-A, IEEE 802, etc.

The invention claimed is:

1. A method for controlling a physical uplink control channel (PUCCH) transmission power by user equipment (UE) in a wireless communication system, the method comprising:
   determining an uplink transmit (Tx) power for PUCCH format 3 transmission; and
   transmitting PUCCH format 3 with the determined uplink Tx power,
   wherein the uplink Tx power is determined based on an uplink Tx power control parameter corresponding to a type of a transmission diversity scheme applied for transmitting the PUCCH format 3, and
   wherein the uplink Tx power control parameter is determined based on a number of HARQ bits in a specific subframe and whether the specific subframe is composed of an Scheduling Request (SR), and
   wherein frequency switched transmit diversity (FSTD), space time block coding (STBC), space frequency block coding (SFBC) or precoding vector switching (PVS) is used to transmit the PUCCH format 3 when a number of information bits exceeds a predetermined number of information bits from among bits of the PUCCH format 3.

2. The method according to claim 1, wherein the uplink Tx power is determined using different values of an uplink Tx power control parameter based upon the type of the transmission diversity scheme.

3. The method according to claim 1, wherein the uplink Tx power control parameter corresponding to the type of the transmission diversity scheme is represented by Equation A:

$$h(n_{CQI}, n_{HARQ}, n_{SR}) = \frac{n_{HARQ} + n_{SR} - 1}{2} \text{ or} \quad \text{[Equation A]}$$

$$h(n_{CQI}, n_{HARQ}, n_{SR}) = \frac{n_{HARQ} + n_{SR} - 2}{2} \text{ or}$$

$$h(n_{CQI}, n_{HARQ}, n_{SR}) = \frac{n_{HARQ} + n_{SR} - 1}{4} \text{ or}$$

$$h(n_{CQI}, n_{HARQ}, n_{SR}) = \frac{n_{HARQ} + n_{SR} - 2}{4} \text{ or}$$

$$h(n_{CQI}, n_{HARQ}, n_{SR}) = \frac{n_{HARQ} + n_{SR} - 1}{8},$$

wherein $n_{CQI}$ indicates a number of information bits of a channel quality indicator (CQI) in the specific subframe, $n_{HARQ}$ represents a number of HARQ bits in the specific subframe, and $n_{SR}$ is 1 when the specific subframe is composed of an SR for a UE having no transport block related to UL-SCH and 0 in other cases.

4. The method according to claim 1, wherein the uplink Tx power control parameter corresponding to the type of the transmission diversity scheme is represented by Equation B:

$$h(n_{CQI}, n_{HARQ}, n_{SR}) = \frac{n_{HARQ} + n_{SR} - 1}{3} \text{ or} \quad \text{[Equation B]}$$

$$h(n_{CQI}, n_{HARQ}, n_{SR}) = \frac{n_{HARQ} + n_{SR} - 1}{2},$$

wherein $n_{CQI}$ indicates a number of information bits of a channel quality indicator (CQI) in the specific subframe, $n_{HARQ}$ represents a number of HARQ bits in the specific subframe, and $n_{SR}$ is 1 when the specific subframe is composed of an SR for a UE having no transport block related to UL-SCH and 0 in other cases.

5. The method according to claim 1, wherein spatial orthogonal resource transmit diversity (SORTD) is used to transmit the PUCCH format 3 when the number of information bits is less than the predetermined number of information bits from among the bits of the PUCCH format 3.

6. A user equipment (UE) for controlling a PUCCH transmission power in a wireless communication system, comprising:
   a processor configured to determine an uplink Tx power for PUCCH format 3 transmission; and
   a transmitter configured to transmit PUCCH format 3 with the determined uplink Tx power, wherein the processor determines the uplink Tx power based on an uplink Tx power control parameter corresponding to a type of a transmission diversity scheme applied for transmitting the PUCCH format 3, and wherein the uplink Tx power control parameter is determined based on a number of HARQ bits in a specific subframe and whether the specific subframe is composed of an Scheduling Request (SR), and wherein frequency switched transmit diversity (FSTD) space time block coding (STBC), space frequency block coding (SFBC) or precoding vector switching (PVS) is used to transmit the PUCCH format 3 when a number of information bits exceeds a predetermined number of information bits from among bits of the PUCCH format 3.

7. The UE according to claim 6, wherein the processor determines the uplink Tx power using different values of an uplink Tx power control parameter based upon the type of the transmission diversity scheme.

8. The UE according to claim 6, wherein the processor controls the PUCCH format 3 to be transmitted using SORTD when the number of information bits is less than the predetermined number of information bits from among the bits of the PUCCH format 3.

* * * * *